United States Patent
Kamimura

(10) Patent No.: US 9,678,996 B2
(45) Date of Patent: Jun. 13, 2017

(54) CONFLICT RESOLUTION SYSTEM FOR DATABASE PARALLEL EDITING

(76) Inventor: Kunio Kamimura, Matsumoto (JP)

( * ) Notice: Subject to any disclaimer, the term of this patent is extended or adjusted under 35 U.S.C. 154(b) by 1924 days.

(21) Appl. No.: 12/995,158

(22) PCT Filed: Jun. 3, 2009

(86) PCT No.: PCT/JP2009/002490
§ 371 (c)(1),
(2), (4) Date: Nov. 29, 2010

(87) PCT Pub. No.: WO2009/147846
PCT Pub. Date: Dec. 10, 2009

(65) Prior Publication Data
US 2013/0226886 A1    Aug. 29, 2013

(30) Foreign Application Priority Data

Jun. 4, 2008  (WO) ................ PCT/JP2008/001424
Jun. 12, 2008 (WO) ................ PCT/JP2008/001506

(51) Int. Cl.
G06F 17/30  (2006.01)
G06F 17/00  (2006.01)

(52) U.S. Cl.
CPC .. G06F 17/30309 (2013.01); G06F 17/30348 (2013.01)

(58) Field of Classification Search
None
See application file for complete search history.

(56) References Cited

U.S. PATENT DOCUMENTS 5,325,496 A    6/1994  Hays et al.
5,781,910 A    7/1998  Gostanian et al.
(Continued)

FOREIGN PATENT DOCUMENTS

CN    101765831 B    10/2012
JP    S61-14853      6/1986
(Continued)

OTHER PUBLICATIONS

Nakamura, etc. "Evasluation of Duplication System in Adaptive On-line Storage System" IPSJ SIG Tech. Rep., Nov. 14, 2002, AVM38-6, Tokyo (Cited again for National Phase of PCT/JP09/2491 and 2501, by JPO on Mar. 17, 2011).
(Continued)

*Primary Examiner* — Yicun Wu

(57) ABSTRACT

As a conflict resolution method for the modification/editing of databases, the mechanism "for assigning priority to editing based on more up-to-date information" is disclosed. The method is effective in both full-fledged "parallel DB editing" in which a computer holds duplicated DBs permanently and the case in which a computer holds the duplicated DBs temporarily. The method is characterized in that "editing based on old information is determined to be ineffective."

When the information for which a conflict is predicted is edited, the possibility that the editing becomes ineffective can be reduced by a "substantially online operation" which performs "the synchronization with the up-to-date information, the editing, and the transmission of the editing records" quickly. Conversely, when the information for which the conflict is not predicted is edited, it is possible to carry out a "substantially off-line operation" which performs the editing at slow speed and transmits the editing records collectively after the synchronization of the information.

12 Claims, 10 Drawing Sheets

(56) References Cited

U.S. PATENT DOCUMENTS

| | | | |
|---|---|---|---|
| 5,870,765 A | 2/1999 | Bauer et al. | |
| 5,884,325 A | 3/1999 | Bauer et al. | |
| 5,890,176 A | 3/1999 | Kish et al. | |
| 5,926,816 A | 7/1999 | Bauer et al. | |
| 6,151,606 A | 11/2000 | Mendez | |
| 6,343,299 B1 | 1/2002 | Huang et al. | |
| 6,598,059 B1* | 7/2003 | Vasudevan et al. | 707/999.203 |
| 6,668,260 B2 | 12/2003 | Zoltan | |
| 6,701,345 B1 | 3/2004 | Carley et al. | |
| 6,874,001 B2 | 3/2005 | Narang et al. | |
| 6,892,210 B1 | 5/2005 | Erickson et al. | |
| 7,058,664 B1* | 6/2006 | Hsu | 707/676 |
| 7,062,503 B1* | 6/2006 | Kamvysselis | 707/999.102 |
| 7,177,866 B2 | 2/2007 | Holenstein et al. | |
| 7,213,037 B2 | 5/2007 | Rangadass | |
| 7,302,446 B1 | 11/2007 | Boothby | |
| 7,308,448 B1 | 12/2007 | Martin | |
| 7,315,862 B1 | 1/2008 | Crump et al. | |
| 7,403,945 B2 | 7/2008 | Lin et al. | |
| 7,415,467 B2 | 8/2008 | Jeevanjee et al. | |
| 7,664,779 B1 | 2/2010 | Rankov et al. | |
| 7,761,410 B2 | 7/2010 | Hunt et al. | |
| 7,792,792 B2 | 9/2010 | Witriol et al. | |
| 2003/0093431 A1* | 5/2003 | Cooke et al. | 707/100 |
| 2005/0198079 A1 | 9/2005 | Heeb | |
| 2006/0173885 A1 | 8/2006 | Moir et al. | |
| 2007/0233900 A1 | 10/2007 | Bartlett et al. | |
| 2007/0282914 A1* | 12/2007 | Sivapragasam et al. | 707/200 |
| 2008/0059469 A1 | 3/2008 | Pruet | |
| 2010/0131465 A1* | 5/2010 | Deniel | 707/613 |
| 2010/0208630 A1* | 8/2010 | Nakahara et al. | 370/296 |

FOREIGN PATENT DOCUMENTS

| | | |
|---|---|---|
| JP | S62-57070 | 3/1987 |
| JP | H03-256146 | 11/1991 |
| JP | H05-189284 | 7/1993 |
| JP | H05-204727 | 8/1993 |
| JP | H05-233405 | 9/1993 |
| JP | H09-91184 | 4/1997 |
| JP | H09-091184 | 4/1997 |
| JP | H10-198589 | 7/1998 |
| JP | A H11-3368 | 1/1999 |
| JP | H11-168555 A | 6/1999 |
| JP | H11-219309 | 8/1999 |
| JP | H11-219309 A | 8/1999 |
| JP | H11-272533 | 10/1999 |
| JP | 2000-20370 | 1/2000 |
| JP | 2000-020370 | 1/2000 |
| JP | 2000-132603 A | 5/2000 |
| JP | 2000-194592 | 7/2000 |
| JP | 2000-222268 A | 8/2000 |
| JP | 2000-284998 | 10/2000 |
| JP | 2000-339211 A | 12/2000 |
| JP | 2002-032248 | 1/2002 |
| JP | 2002-32248 | 1/2002 |
| JP | 2002-244907 | 8/2002 |
| JP | 2002-244907 A | 8/2002 |
| JP | 2003-122509 | 4/2003 |
| JP | 2003-256258 | 9/2003 |
| JP | 2004-013367 | 1/2004 |
| JP | 2004-13367 | 1/2004 |
| JP | 2004-013867 | 1/2004 |
| JP | 2004-13867 | 1/2004 |
| JP | 2004-86800 | 3/2004 |
| JP | 2004-86800 A | 3/2004 |
| JP | 2005-63374 | 3/2005 |
| JP | 2005-063374 | 3/2005 |
| JP | 2005-216167 | 8/2005 |
| JP | 2005-216167 A | 8/2005 |
| JP | 2007-179105 A | 7/2007 |
| JP | 2007-179105 A | 7/2007 |
| JP | 4573277 B2 | 11/2010 |
| JP | 4855537 B2 | 1/2012 |
| JP | 4855538 B2 | 1/2012 |
| JP | 4923140 B2 | 4/2012 |
| JP | P5543918 | 7/2014 |

OTHER PUBLICATIONS

P.A.Bernstein etc, Concurrency controll and recovery in database systems, 1987, Addison-wesley. (Note: Someone may say that Section 4 of p. 113-138 relates to the application).

Kemme et al., A New Approach to Developing and Implementing Eager Database Replication Protocols, Swiss Federal Institute of Technology, ACM Transactions on Database Systems.

Birman, K., Schiper, A., and Stephenson, P. 1991. Lightweight causal and atomic group multicast. ACM Trans. Comput. Syst. 9, 3(Aug.), 272-314.

Moser, L. E., Melliar-Smith, P. M., Agarwal, D. A., Budhia, R. K., and Lingley-Paradopou-Los, C. A. 1996. Totem: a fault-tolerant multicast group communication system. Commun.

Mark Dodg, Microsoft Office Excel 2003 Official Manual, vol. 1, Nikkei BP SoftPress, Jul. 12, 2004, p. 535-548, Tokyo, Japan (in Japanese).

Andrew S. Tanenbaum, Distributed Systems, vol. 1, Pearson Education Japan, Oct. 20, 2003, p. 614-634, 698-701, Tokyo, Japan (in Japanese).

Microsoft Access 97 for Windows Ver.8.0, vol. 1, Micorsoft Corp., Mar. 25, 1998, p. 569-599, Tokyo, Japan (in Japanese).

Kawashima, T., Hirokawa, H., Yamashita, M., "A World-wide Distributed File System SKINNY", IPSJ SIG Notes, Aug. 22, 1995, vol. 95, No. 79, p. 1-8(95-OS-70-1), Tokyo, Japan (in Japanese).

Shikii, T., "C++Builder database programming No. 2", InsideWindows, SoftBank, p. 71-77, vol. 3, No. 12, Dec. 1, 1997, Tokyo Japan (in Japanese).

Hiroyuki Hasegawa, "Relations among tables and contradictions on relations", Access 2000 [Query-Relation] First Edition, Nov. 1, 1999, p. 66-p. 73, A-I Publishing, Tokyo, Japan.

Nakamura, etc. "Evaluation of Duplication Management System in Adaptive On-line Storage System" (Sec3.2, FIG2), IPSJ SIG Tech. Rep., Nov. 14, 2002, p. 31-36, 2002-AVM-38-6, Tokyo.

Athena Telecom Lab, Inc., "New developing project spreading over the world", web contents referenced from http://www.atele.com, uploaded from Mar. 9, 2009 to Apr. 23, 2009 2.

P.A.Bernstein etc, Concurrency COntrol and recovery in database systems, 1987, Addison-weslay. p. 1-42, p. 143-164, p. 217-218, p. 265-307.

Dolev, D. and Malki, D. 1996. The TRansis approach to high availability cluster communication. Commun. ACM 39, 4, 63-70.

Van Renesse, R.,Birman, K.P., and Maffeis, S. 1996. Horus: a flexible group communication system. Commun. ACM 39, 4, 76-83.

Kemme et al., A New Approach to Developing and Implementing Eager Database Replication Ptotocols, Swiss Federal Institute of Techinology, ACM Transactions on Database Systems.

Birman, K., Schiper, A., and Stephenson, P. 1991. Lightweigt causal and atomic group multicast. ACM Trans. Comput. Syst. 9, 3(Aug.), 272-314.

Moser, L. E., Melliar-Smith, P. M., Agarwal, D. A. Bughia, R.K., and Lingley-Paradopou-Los, C. A. 1996, Totem: a fault-tolerant multicast group communication system, Commun.

M. Stonebraker, Concurrency Control and Consistency of Multiple Copies of Data in Distributed INGRES, IEEE Transactions on Software Engineering, vol. E-5, No. May 1979.

Kawell, et al, Replicated Document Management in a Group Communication System, Proc. Second Conference on Computer Supported Cooperative Work, Sep. 1988.

J. Gray, et al, TThe dangers of replication and a Solution. 1996. in Proceedings of the ACM SIGMOD International Conference on Management of Data (S1GMOD '96, Montreal, Canada).

T. Arai, et al, A masterless DB synchronization system and its application to a seamless video watching system, IPSJ SIG Techinical Report, p. 299-304, 2006.

Athena Telecom Lab, Inc., "New developing project spreading over the world", web contents referenced from http://www.atele.com, uploaded from Mar. 9, 2009 to Apr. 23, 2009.

(56) References Cited

OTHER PUBLICATIONS

Athena Telecom Lab, Inc., "New developing project spreading over the world", web contents referenced from http://www.atele.com, uploaded from Oct. 7, 2009 to Jan. 6, 2010.
Athena Telecom Lab, Inc., "Report of patent status", web contents referenced from http://www.atele.com, uploaded May 31, 2012.
藤田将幸, 効き目抜群！Active Directory実践テクニック最終回 複製の競合に関するトラブルシューティング, , Windows 2000 World, Japan, 株式会社IDGジャパン, , Jun. 1, 2003, vol. 8, No. 6, pp. 171-173.
MSDN Selection(2), Microsoft Winfdws NT Active Directory 技術概要1, , アスキーNT, Japan, 株式会社アスキー, , Jul. 1, 1998, vol. 3, No. 7, pp. 268-279.
Maurice Herlihy et al. "Software Transactional Memory for Dynamic-Sized Data Structures", Jul. 2003, Annual ACM Symposium on Principles of Distributed Computing Proceedings.

\* cited by examiner

CONFLICT RESOLUTION SYSTEM FOR DATABASE PARALLEL EDITING

TECHNICAL FIELD

The present invention relates to resolution of conflict occurred by "parallel editing works to plural duplications" (hereinafter "parallel DB editing") of a database (hereinafter "DB").

BACKGROUND ART

As a general operation, a "server computer" (hereinafter "server") has a database to which "terminal computers" (hereinafter "PC"s) access. "Pessimistic lock cursor" (non-patent literature 1) and "transaction lock" are used for preventing competing of access.

MVCC (non-patent literature 1) uses "lock of editing work" (non-patent literature 4 and 5). Cache (non-patent literature 6) and ObjectStore (non-patent literature 7), that are products of OODB, also uses "lock of editing work". PostgreSQL of relational DB (RDB) uses a command "LOCK TABLE", in order to avoid simultaneous updating work (non-patent literature 5). This is also an "lock of editing work". Patent document 1 is also an lock of editing work.

Cache art, that makes duplication for temporal working, is used for increasing efficiency of a processing and communication. ADO.NET of Microsoft makes a copy of data that are required for a present work from a server. Next, it cuts connection with the server and performs an editing work. After editing work, it connects to the server again, and sends "contents of editing work" to the server. This "editing work" will be repealed, if editing target information has been already changed by other PCs. This is called "optimistic concurrency control" (non-patent literature 7 and 8). This can be interpreted that; when a lock failed as the result, editing work is repealed. Thus, this is one kind of lock. This specification calls this method "first-arrival priority" for comparison with other methods. This "first-arrival priority" sometimes makes inconvenience as shown below.

(1) There is a case that an editing work based on the latest information is judged invalid. An editing work based on the latest information might be the best. If this is judged invalid, it will be a problem on actual DB operations.

For example, an operator of PC-X made a necessary copy from a server, and wrote at 9:00 in the morning that "this customer is a banter. No hospitality is necessary", and left it for a while. On the other hand, an operator of PC-Y acquires information that "the customer proposed big-ticket dealings" at 12:00 noon. He writes "We should give him the maximum hospitality to get a contract" and sends it up to the server. A minute before this, if PC-X sends his edit up to the server, the edit by PC-Y will become invalid. This is the situation where editing work of PC-Y based on the latest information was opposed by capricious operation of the operator of PC-X.

(2) Since duplications are made for every editing works (page 19 of non-patent literature), communications for (and processes of) making these duplications will be excessive. To reduce them, range of duplication should be restricted. But it needs detailed knowledge of information that is treated by the application program. This is a common problem of methods based on cache.

In patent document 2, the latter editing work is judged invalid, if there were changes on a specified range. Indeed, the lower part of page (6) of the referenced invention shows that "if said record was changed by another process, update will be refused". This is "first-arrival priority" and has the same problem of ADO.NET.

Based of time of editing work performed to duplicated DB, patent document 3 "rearranges, from the earliest time, versions of competing editing works (Step S604)" (Paragraph 0065 and 0079 of patent literature 3). And contents of the oldest date and time will be the latest version (Paragraph 0097). This means that priority is assigned to the earlier editing work. This description calls this method "first-edit priority" for comparison with other methods.

There is also a case, in which "first-edit priority" makes problems. For example, suppose that a computer is keeping results of editing work that were performed at a certain time (for example, one year before). If these results are sent up to a server suddenly one day and become effective, all editorial contents done in the past one year by other computers will be invalidity. Such operation is not usually acceptable. Patent document 4 has same problem, since it judges "editing work of earlier editing time" valid.

Patent document 5 assigns priority to later editing work. This specification calls this method "unconditional overwriting" for comparison with other methods. The referenced document assumes that amendments of each PC will be propagated, in nearly real time, to other PCs. Under this situation, "unconditional overwriting" has no problem.

However, for a case where plural PCs keep duplicated DBs and perform parallel editing works to them as described in this specification, it is impossible to propagate contents of editing work to other PCs immediately. If "unconditional overwriting", that always overwrites by later editing contents, is applied to this case, operators of PCs cannot understand why each of edit is judged valid or invalid. We should consider a situation where a clock of PC, that determines editing time, differs from each other, and a possibility that the clock was changed intentionally. There are many problems to be solved if "unconditional overwriting" is used for the parallel editing works.

Other results of an investigation are shown below. Non-patent literature 6 is an invention about conditions for invoking synchronization of database. As synchronization method, it only shows an general concept of synchronization, that is synchronization by exchanging contents of editing work. This assumes that updating works ("recorded contents of editing work" of this description) created by parallel editing works are exchanged among them. There is a possibility that sequence of applying them to each DB will be different from each other, because of various reasons (delay of retransmission by errors, a gap of transmitting timing, and so on). And, there will be a serious problem, in which duplicated DBs are not same. However, no way resolving this problem is shown.

Patent document 7 is a invention that keeps all data of updating when competitions among editing works occur. It updates the original, only when there is no competition. Both the contents and the purpose differ from that of the present invention.

Non-patent literature 10 is invention that relates to file cache. It simply refuses editing works, when collision (that is competition of the present invention) among editing works is detected. It does not judge which one is valid. On the contrary the present invention selects valid one among editing works that collide each other.

Patent documents 8, 9, 10, 11 and 12 were also investigated, but they cannot do "solving conflicts caused by parallel DB editing", which is the purpose of the present invention.

[Patent document 1] Patent application published H11-272534,A
[Patent document 2] Patent application published S61-134853,A
[Patent document 3] Patent application published 2005-216167,A
[Patent document 4] Patent application published H09-91184,A
[Patent document 5] Patent application published 2004-13867,A
[Patent document 6] Patent application published 2004-86800,A
[Patent document 7] Patent application published 2006-284998,A
[Patent document 8] Patent application published H11-161535,A
[Patent document 9] Patent application published 2005-503606
[Patent document 10] Patent application published 508050-508050
[Patent document 11] Patent application published H08-16447,A
[Patent document 12] Patent application published 2000-501532
[Non-patent literature 1] William R. Vaughn, translated by "Top Studio", Yukiko Ito editorial supervision, "Windows (Trade Mark) database programming ADO.NET Specialized lecture, VB.NET", First-edition, Aug. 4, 2003, Shoeisha Co., Ltd., TOKYO
[Non-patent literature 2] "Super illustration SQL handbook", C&R research institute, first-edition issue, Aug. 12, 2005.
[Non-patent literature 3] "Main function and merits" [online], Apr. 22, 2007 search, the Internet (URL: http://www.sonicsoftware.co.jp/products/objectstore/function.html)
[Non-patent literature 4] "MVCC (multi version concurrency control) 9.1 Start", [online], Apr. 22, 2007 search, the Internet (URL:http://www.postgresql.jp/document/pg721doc/user/mvcc.html #MVC C-INTRO)
[Non-patent literature 5] "9.5. The consistency-of-data check in an application level", [online], Apr. 22, 2007 search and the Internet (http://www.postgresql.jp/document/pg721doc/user/applevel-consistency.html)
[Non-patent literature 6] "Cache art Guide", [online], Apr. 22, 2007 search, the Internet (URL: http://www.intersystems.co.jp/cache/technologyguide/technologyguide.html)
[Non-patent literature 7] "Main functions and merits", [online], Apr. 22, 2007 search, Internet (URL: http://www-.sonicsoftware.co.jp/products/objectstore/function.html)
[Non-patent literature 8] "Outline of the data concurrency control in ADO.NET", January, 2007, MSDN subscription library (msdn subscriptions Library), A disk file, (URL:ms-help://MS.MSDNQTR.v80.ja/MS.MSDN.v80/MS.VisualStudio.v80.ja/dvrad data/html/d5293098-4a88-4110-abd2-34d9e6661664.htm)
[Non-patent literature 9] "Tutorial: Process of a concurrency exception", January, 2007, MSDN subscription library (msdn subscriptions Library), a disk file (URL: ms-help://MS.MSDNQTR.v80.ja/MS.MSDN.v80/MS.VisualStudio.v80.ja/dv_raddat a/html/73ee9759-0a90-48a9-bf7b-9d6fc17bff93.htm)
[Non-patent literature 10] "A World-wide Distributed File System SKINNY", IPSJ SIG Notes 95-S-70-1, Academic Publication IPSJ SIG Notes Vol. 95, No. 79 ISSN 0919-6072

DESCRIPTION OF THE INVENTION

Problems to be Solved by the Invention

The purpose of the present invention is to solve "competition of editing works" that will occur when duplicated DBs of plural PCs are simultaneously edited. Investigated were "first-arrival priority" that is extension of cache art, "first-edit priority" and "unconditional overwriting system". Various problems were found with them. It is presumed that "not so serious problems" are ignored, because "duplicated DBs held by plural PCs" are temporal duplication as cache. The present invention proposes full-scale "parallel DB edit" and shows a method solving "competition of editing works". Application to cache art is also considered.

Means for Solving the Problem

The present invention solves collision of editing works of "parallel DB edit" by policy of "assigning priority to an edit based on newer information". A case where it has been applied to full-scale "parallel DB edit" is explained. Application to "cache art" is also explained. Below, it explains based on one example of application.

(1) Preparation

Duplicated DBs (hereinafter "local original DB") of the original DB (hereinafter "global original DB") are placed in plural PCs. This local original DB has initial version, which is an ordinal number indicating order of updating.

The easy example of realization of this ordinal number is an integer, and it is natural to set "0" as an initial value. The present invention solves collisions by this version. Each PC updates duplicated DB at each (probably operator's) convenient occasion, and updates a version. The followings are detailed explanation.

(2) Local Editing Work

Each PC performs local editing work to local original DB held by each PC. Before this editing work, a copy of the "local original DB" for temporal work is made. Editing work will be performed to this copy. At editing work, "recorded contents of editing work" of this work is created. "Editorial contents", "version of edit", "range of checking no-change" and others are recorded in this "recorded contents of editing work".

"Editorial contents" are general editorial contents, which are "what information was changed to what", "what information was added", "what information was deleted", and so on. "Version of edit" was a version of "local original DB" that was an object of editing work. Strictly saying, that was version of "local original DB" that was copy origin of "temporal working DB" edited.

"Range of checking no-change" is the range of information that is premised by the editing work. This means that "the editing work becomes meaningless, when information on this range was changed before the editing work is decided". According to the characteristic of the information of DB, especially the information on the object to be edited, various settings to "range of checking no-change" are possible. In general operation, information of edited object might be in "range of checking no-change". But there is no necessity to do so. As for a relational DB (hereinafter "RDB"), table of an edited object, a group of tables logically connected with the edited object, a part of the records of them, whole DB and others may be contained in that.

When suitable "range of checking no-change" is set according to the character of information, the user-friendliness of DB becomes good. When "range of checking no-change" is small, many concurrent editing works will be performed without troubles. And it is good to set combination of minimum indispensable information as an "range of no change".

(3) Sending of "Recorded Contents of Editing Work" to Server

Each PC sends "recorded contents of editing work" to a server. When "version of edit" and "range of checking no-change" are recorded separated from "recorded contents of editing work", they are sent along with information that shows relation to the "recorded contents of editing work". If a "recorded contents of editing work" contains "version of edit", "range of checking no-change" and furthermore "version setting range" that is explained later, the communication procedure will be simple.

(4) Receiving of "Recorded Contents of Editing Work" by Server

The server records "recorded contents of editing work" that arrived from PC, with the turn of the arrival.

(5) Receiving of "Recorded Contents of Editing Work" from Server

PC requires transmission of un-received "recorded contents of editing work", to the server. And PC receives these "recorded contents of editing work" and "version of edit". Further, PC receives "range of checking no-change" or "version setting range", if necessary.

PC also receives the turn of the arrival to the server of recorded contents of editing work. This communication procedure will be simple, if the server records the "turn of arrival" on "recorded contents of editing work" that arrived from PC.

(6) Updating of Local Original DB

PC takes out a "recorded contents of editing work" received from the server in the specified turn. And PC judges validity of the "recorded contents of editing work". Details of this procedure will be explained by "procedure of checking validity" later. Local original DB and its version will be updated. When version is an integer, it is natural to raise one at a time in an order from initial "0". The PC performs all handling of specified "recorded contents of editing work" to the last. (No new editing work is performed during this handling.) Therefore, it is possible to do as follows. Local original DB is updated by all "recorded contents of editing work" to the last received from the server, and after that, version is updated by (the number of processed recorded contents of editing work).

<Synchronization by Version, which is a Kind of Time>

All the PC takes out "recorded contents of editing work" (created by local editing work in each PC) by the arrival sequence to the server, and updates local original DB and its version. Since the same information is used in the same turn and processed by the same logic, local original DBs obtained as a result and their version synchronize. Even if global original DB is not updated or global original DB does not exist, local original DB of each PC synchronizes, by this mechanism.

Since each PC updates each local original DB at each convenient occasion, progress of version updating of local original PC of each PC is different from each other, in real time. However, the sequence of updating is same. Contents of "local original DB" s are the same, if they have same version. That is, a version is considered as a time common to each PC in parallel DB access. That is, by the present invention, local original DB of each PC synchronizes by versions, which are a kind of time.

Above explanation is for a case of setting single version to whole DB. For a case of setting a group of information as "version setting range" which will be explained later, version is recorded to the range and is updated when information in the range is updated (added, modified or deleted).

<Judgment of Validity>

"A judgment of the validity of recorded contents of editing work" is an important part of the present invention. Before updating "local original DB" by recorded contents of editing work (Y), investigated are past "recorded contents of editing work" that updated information in "range of checking no-change" indicated by Y. When Y is judged valid for all of them, Y is judged valid. Here, the followings are assumed for explanation. X is one of "recorded contents of editing work" that updated information in "range of checking no-change" indicated by Y. Notations are;

y: "version of edit of Y"=version of "local original DB" that was object of Y.

x: "version of edit of X"=version of "local original DB" that was object of X.

nx: version of the original that was set by updating based on X. Naturally, "x<nx."

Condition that Y is invalid against X is that either of the following two is satisfied. When Y is invalid against at least one X, Y is judged invalid and is not used to update local original DB.

(Condition No. 1 from which Y becomes invalid) X has changed information in "range of checking no-change" of Y. And "y<x". That is, Y is judged invalid, because "version of edit" of Y is older than X.

(Conditions No. 2 from which Y becomes invalid) X has changed information in "range of checking no-change" of Y. And "y=x". That is, X of first arrival is judged valid and Y is judged invalid, when they have same "version of edits".

Traditional methods, such as "first-arrival priority" or "first-edit priority", have a problem by which priority is assigned to an edition based on old information not to the edition based on the newest information. However, the present invention excludes this problem by the two conditions mentioned above.

On the contrary, condition that Y is valid against X is that either of the following two is satisfied. When Y is valid against all of Xs, Y is judged valid and is used to update local original DB.

(Conditions No. 1 from which Y becomes valid) Assume that X did not update information in "range of checking no-change" of Y. By only this condition, Y is judged valid against X.

(Conditions No. 2 from which Y becomes valid) When X has changed some information in "range of checking no-change" of Y and "x<y", Y is valid against X.

When Y is valid against all Xs, Y is judged valid and is used to update local original DB.

When the principle (by which a priority is assign to an edit with newer "version of edit") is strictly applied, the update procedure will be split by the relation between "y" and "nx", Case of (x<) nx<=y: Local original DB that is object of editing work by Y contains information changed by X. Therefore, the updating by X is kept. And updating by Y is performed.

In case of "(x<) y<=nx": Y has been performed to local original DB with no information changed by X. If the principle (by which a priority is assigned to edit based on newer information) is strictly applied, updating by Y will be performed, after cancelling the updating by X. The condition of "(x<) y<nx" is called "cancellation conditions of editing work" of X.

In fact, the following method is practical, when Y became valid for above "Conditions No. 2 from which Y becomes valid". That is, to update by overwriting with Y, without "checking the above condition of '(x<) y<nx'". Here, update of X is not repealed. Naturally, there will be a case to be different from the policy that priority is assigned to edit with newer version of edit. However, it is convenience on operation that updating work performed once is not canceled. The determining procedure of validity is simple and clear. Persons relating to "parallel DB access" can easily understand behavior of database. Development of a system also becomes easy. Operation, by which cancellation of updating is allowed, will be explained later.

<Flow of General Operation>

A series of explanatory operations by a certain PC is explained below. Here, we assume that, the PC received the newest of "recorded contents of editing work" from a server and updated its "local original DB". And, this PC performed editing work to "local original DB", after another PC sent up "recorded contents of editing work" to the server. This editing work is sent up to the server as "recorded contents of editing work" Y. Next, "recorded contents of editing work" (un-received till then) are received from the server. And, "recorded contents of editing work" are taken out in indicated sequence and are used to update "local original DB". In this process, some edit (for example edit X) are judged valid and are used to update "local original DB".

Finally, "recorded contents of editing work" Y, that was sent up previously, is taken out, and is evaluated about relations to edit X and others by the "procedure of judging validity". Y is invalid, if it is invalid to one X. Operator of this PC confirms the fact and reasons of the invalidity. If necessary, he tries editing (to the latest information) again. If there are records of the original input which became invalid, it is easy to input the contents again. If valid, "recorded contents of editing work" Y will be used for updating "local original DB".

<Almost on-Line Operation and Almost Off-Line Operation>

An operator of PC should just understand "editing work based on old information will be judged invalid in higher possibility". In order to decrease possibility that "editing work by a PC" is judged invalid, the following steps are appropriate. Just before the editing work, the PC receives "recorded contents of editing work" to the newest, and updates local original DB by them. The PC performs editing work to this latest local original DB. Immediately after this editing work, the PC sends up the "recorded contents of editing work". If the updating is performed frequently, the local original DB is maintained at the newest state. This can be called "almost on-line operation".

However, in cases treating information that has rare competition possibility among editing works, a possibility that editing work becomes invalid is small, even if time span from "updating of local original DB" to "sending up of the edit" is long. For example, in cases inputting debit slips by each section of a company, the records are amended when input mistakes and mishandling are discovered. Even so, most of these amendments are performed by the computer that input these original records. This kind of cases had no problems caused by "almost off-line operation", which has long time span from "updating of local original DB" to "sending up of the edit". Even in the situation without Internet connection, debit slips can be inputted slowly. They can be sent up collectively, after becoming near settlement of accounts or an inspection.

<<The Whole Picture of a Means for Solving Problem>>

The followings are explanations of the whole of the invention, including an example and its variations.

(1) Manipulation to "Recorded Contents of Editing Work" and its Turn

"Recorded contents of editing work" and their sequence to be sent to PC from the server has no necessity to be exactly same to that sent up by PC. There is no necessity keeping sequence of sending up. When "recorded contents of editing work" and their sequence are exactly same for every PC, these local original DBs synchronize.

The server or a PC in charge of an administrative task analyzes detail of "recorded contents of editing work" and can delete a portion that has errors and should be repealed or a redundant (that is equivalent to do nothing after all) portion. Even if error or redundant "recorded contents of editing work" are deleted and the sequence is packed, there is no problem. Even if sequence of "recorded contents of editing work" are changed considering priority of operators or considering others, local original DBs synchronize.

(2) Updating Global DB by Server

In the previous example, a local original DB is updated by a series of edits received from the server. Contents of local original DB of each PC that received to the same "recorded contents of editing work" will be same, from the following. Each initial state of "local original DB" is same. Sequence and contents of set of "Recorded contents of editing work" to be applied to each of them are same. Each local original DB is updated by same logic. Though there is no "global original DB", local original DBs of every PC synchronize. It can be thought that they synchronize with virtual "global original DB".

An operation, by which a server has "global original DB" actually and updates it, is possible. The main points are the following.

(a) "Global original DB" is placed in the server. Each PC has local original DB that is a duplication of this "global original DB".

(b) At editing work to local original DB, each PC creates "recorded contents of editing work" and send it to the server.

(c) By arrival sequence of "recorded contents of editing work" from PCs, the server confirms competition among edits, updates global original DB by an edit that was judged valid, and updates the version.

(d) By information from the server, each PC updates its "local original DB" and version. This is synchronization.

It is easy to explain the procedure, when original DB is placed in the server. But actual procedure is complicated. It is difficult to tell PC about status of the processing. That is, it is difficult telling to an operator of PC who performed the editing work about what "editing work" was judged invalid and how it was decided.

By the previous method, where each PC updates each "local original DB", each PC can grasp all situation about editing work which is valid or invalid. However, when the server updates original DB, a complicated procedure is necessary for telling detailed situation to each PC.

Operation by which the server updates global original DB has an merit that "updating process is upgraded by changing processing program of the server". Suitable operation will be chosen, considering characteristic of data, ease of use, and balance to the complexity of the above process, and so on.

(2.1) Telling to PC

When updating global original DB, each local original DB should synchronize to the latest global original DB. Assuming "data volume of global original DB is huge" is a commonsense. It is not practical to send the whole. If sets of recorded contents of editing work and their sequence are sent to each PC, it is substantially the same with updating each local original DB by PC. Merits of updating global original DB by the server are small. After all, realistic way is to send differential information of updating of global original DB.

(2.2) Application to the Cache

A method of the present invention assigning priority to edit based on newer information can be applied to a method of using cache art, which creates a copy of required portion of the global original DB from a server (before editing works by each PC) and performs editing work to this copy. When making a copy that is required for the editing work, acquired is version of the global original DB. "Recorded contents of editing work" is assigned this version as "version of edit", and is sent to the server. The server judges validity by this version of edit. Thereby, eliminated is a case that an "editing work to the latest version" is blocked by an "editing work to old version" that is sent up suddenly. This case was observed about ADO.NET.

(3) Arrangement of Server Functions

Previously explained method is a method updating "local original DB" by each PC. Here, recorded contents of editing work are brought together to a server. The method updating global original DB by a server was also explained. If required function is provided, rental server or dedicated server is sufficient. There is no problem if one of PCs described in this specification provides server functions of this specification.

(4) Introduction of Version Setting Range

Unit that is assigned version and is managed for editing work, needs not to be an actual DB. Portion to which the influence of editing work is closely related is set as "version setting range". By setting version to each range, "editing works" and "transitions of versions" are managed.

The optimal setting up of "version setting range" depends on structure and contents to be treated. In the case of RDB, record, table, group of tables that are logically connected with the table, specific record group in them, or whole DB, and so on, may be assumed.

The process previously explained is applied by reading DB as version setting range. In addition, there is no problem even if one "recorded contents of editing work" contains "editing works" to plural version setting ranges. "Detail of editorial contents", "version of edit", "range of checking no-change", and so on, should be described for each "version setting range".

The personal information on medical is explained as an example. For DB of medical information, individual medical records will be version setting range. If one or several lines of a table are individual information, a version is set up to this lump. DB has much personal information. Version is set to each lump. A "recorded contents of editing work" contains single or plural combinations (each for each individual) of "detailed editorial contents", "version of edit" and "range of checking no-change". "Range of checking no-change" can be set appropriately according to detailed editing work and the purpose. For example, that is "all records for a specific individual" or an "edited record". If each table is for personal information, version may be set up to each table.

It can be used for not only medical information, but also others. It can be used for managing individually information, such as social guarantee, a bank account, a loan, etc. It can also be used for management of offender information that can be edited by plural sections. It is also convenient for treating the information corresponding to an individual, such as advanced "Residential Basic Book" in which resident can edit some part of his own data. As described in "(5) Copy range of local original DB", each PC creates local original DB of personal information that is in range of its authority. If only information in its authority is sent to this PC, any information that is outside of its authority will never be hacked.

(4.1) Timing of Version Setting

Version is set to whole of original DB (global original DB or local original DB), or a "version setting range". The setting method can be chosen according to an "operational convenience" or "characteristic of information to be treated".

Think a method of "updating version by edit judged valid". This method updates the version, when original DB or version setting range is updated by recorded contents of editing work judged valid. Version is not changed until it is updated by valid "recorded contents of editing work". Each version of local original DB synchronized in this period is same.

Think about a method, by which version is updated by all sets of recorded contents of editing work (that are valid or not). This method updates the version, even if the original DB is not changed by valid recorded contents of editing work. Version after sending up of invalid edit is different from the version that was before the sending. Though contents of original DB are same, version of local original DB synchronized later is progressing.

(4.2) Evolution to Time of Receiving Edit

Another possible way is a method of using "time when server received recorded contents of editing work" as version. The word of version that was previously explained can be read as this receiving time. Version was explained as ordinal number for identifying a turn in a sequence. There is no problem, because sequence is also expressed by time stamps.

(4.3) Evolution to Time of "Synchronization Access" to Server

The following method is also possible. PC accesses the server and gets a time at which it checked whether un-received "recorded contents of editing work" exists or not. PC sets this time as version of original DB. In case of updating local original DB, each PC uses a time when PC asked the server (for example, time shown by the server) as version of the local original DB. This does not depend on whether there are edits not yet received or not, or on whether they are valid or not.

In case of updating global original DB by the server, the followings are performed. When there is access from a PC, this time is set as a version of original DB. If required, local original DB of the PC is synchronized with the global original DB. Simultaneously, version (that is, the latest access time) is also synchronized. Priority is assigned to edit to local original DB with newer synchronization access". This rule is easily understood and convincible, by persons who operate one DB by competition.

(5) Duplicate Range of Local Original DB

It is convenient in order to simplify explanation of this application. If we assume that local original DB synchronizes with whole of (real or virtual) global original DB. However, it is more realistic that local original DB synchronizes with a part of global original DB. For example, DB of medical information explained previously has information of many people. For each PC, it is enough to create local original DB of personal information which can be read by the authority of the PC. There is no necessity that local original DB should synchronize to whole global original DB. Doctor's computer has a local original DB that holds the information of plural patients to which he has responsibility. Computer of individual has a local original DB that holds only his personal information.

When a local original DB synchronizes to a part of global original DB, many of "recorded contents of editing work" brought together to the server are not necessary for specific PC. One possible way is a method skipping unnecessary "recorded contents of editing work" after receiving all "recorded contents of editing work" by a PC. If the server selects "recorded contents of editing work" that are necessary for each PC and sends them, traffic volume is reduced and hacking to the information beyond authority is prevented. Even if unnecessary "recorded contents of editing work" remains, what is necessary is to except them by the process of PC. "Recorded contents of editing work" to be sent to a PC are easily determined, if "recorded contents of editing work" under management by the server have been classified based on "version setting range" recorded in each "recorded contents of editing work" in advance.

(6) Operation with "Cancellation of Updating"

Previous explanation treated "operation without cancellation of updating". However, if the principle which assigns priority to an edit of newer version is applied strictly, there is the following case. At "conditions No. 2 from which Y becomes valid", there is a case to cancel updating based on X, before updating "local original DB" by Y. This is the case where "cancellation conditions of editing work" is satisfied, that is, "(x<) y<nx".

(6.1) Analysis No. 1 on Cancellation of Updating

When all the following conditions are satisfied at least, the past updating (that is X described above) is canceled by Y. In addition, the following conditions "No. 3 and No. 4 that are for cancelling updating by X" are equivalent to the above conditions of cancelling editing work.

(Condition No. 1 of Cancelling Updating by X)

Y is still valid, either by another "recorded contents of editing work".

(Condition No. 2 of Cancelling Updating by X)

X had updated "range of checking no-change" of Y.

(Condition No. 3 of Cancelling Updating by X)

"x<y". Version of edit of Y is after X. When this condition is not satisfied, Y is invalid and cannot be a cancellation factor of X.

(Condition 4 of Cancelling Updating by X)

"y<nx". Before "updating of version by X" is notified, updating of local original DB (to y), that is an object of editing work of Y, was performed, This condition and the timing of sending up Y to the server determine cancellation of X.

If sending up of Y is before sending up of X (nx), X is judged invalid when "updating of local original DB by X" is tried. Then, it does not result in a cancellation.

From "condition No. 1 of cancelling updating by X", "recorded contents of editing work", which repeal X, are limited. Edit that is judged invalid because of old version of edit, cannot be a factor of repealing the previous edits.

"Condition No. 2 of cancelling updating by X" implies that setting of "range of checking no-change" has influence to possibility of "cancellation of updating". Possibility of "cancellation of updating" can be small, if "range of checking no-change" is not enlarged carelessly.

"Condition No. 3 and No. 4 of cancelling updating by X" is the following; Version of local original DB is updated (to y) during period of editing work of X. This period is from the time of updating version of local original DB that was an object of editing work X to the time of sending it up to the server. Finally, this local original DB is set as object of editing work Y. Sending edit (X) quickly, possibility of cancellation of X can be small.

(6.2) Method for Preventing Cancellation of Updating

There is a case where preventing cancellation of updating is required, such as a case of changing structure of database.

(Method No. 1 of Preventing Cancellation of Updating: Prohibition of Sending Up)

During editing work by X, suppose that no other PCs have sent up their edits. Even if another PC "updates its local original DB" (Y), during this period, its version will be x and will not be after x. That is, "condition No. 3 of cancelling updating by X" is not satisfied. Suppose that updating of local original DB by Y was performed, after sending of X up. If so, "condition No. 3 of cancelling updating By X" is not satisfied. Thus, "cancellation of updating" is prevented by prohibiting of sending up by other PCs during editing work by X.

(Method No. 2 of Preventing Cancellation of Updating; Prohibition of Updating)

During editing work of X, suppose that another PC sends up its edits. If so, "cancellation of updating" is prevented by prohibiting other PCs to update their local original DBs. One way is prohibiting sending "recorded contents of editing work" from the server. Even if "recorded contents of editing work" are sent, another way, which prohibits updating "local original DB" by the "recorded contents of editing work", may be used.

After sending up of X, any PC can try to update its local original DB. At this time, X is one of sets of "recorded contents of editing work" received from the server. Thus, when local original DB is updated by to the last of received sets of "recorded contents of editing work", its version will be equal with or after "nx". Prohibition of updating local original DB of a PC is cancelled after receiving X. PC uses them to X for updating its "local original DB". Its version will be equal with or after "nx". Thus, version of recorded contents of editing work to them will be nx<y. And the "conditions of cancelling editing work" cannot be satisfied.

Assume that the method, by which time of synchronization access to the server is a version, is used. The same effect is acquired by telling (to PC that accessed) no access time, that is, "access lock" is returned from the server.

(Method No. 3 of Preventing Cancellation of Updating; Prohibition of Editing Work)

Even if, during editing work of X, another PC sent up edits and another PC updated "local original DB", "cancelling of X" will be prevented by prohibiting editing work to this updated local original DB. When the server sends a "recorded contents of editing work" (or at other occasions), prohibition of editing work to its local original DB that has been updated by the "recorded contents of editing work" is notified.

(6.3) Analysis No. 2 of Cancellation of Updating

If updating by "recorded contents of editing work" (that is, X mentioned above) is cancelled, the following procedures are required for completing this cancelling operation.

("Process No. 1" Derived from Cancellation)

Performed is investigation of whether "recorded contents of editing work" judged invalid by X exist or not. If they exist, performed is re-evaluation of whether each of them is valid or invalid.

("Process No. 2" Derived from Cancellation)

Operator reviews journals of an editing work that was judged as invalid by X. If entered information exists, this information will be checked.

("Process No. 3" Derived from Cancellation)

Re-evaluated is validity of "recorded contents of editing work" having version equal with (or after) the version set by updating of X. Namely, this edit was performed after updating by X.

It is possible to perform automatically some parts of above (Process 1) and (Process 3). However, (process 2) etc has a portion that needs cooperation with an operator. Perfect automatic execution is difficult. After cancelling X, the derived processes, that are (Process 1), (Process 2) and (Process 3), are not immediately performed. The fact of cancellation of X is correctly informed to an operator. It is realistic to entrust judgment of re-input to the operator. The operator can reacts rationally, if the fact of invalidity, and its object and reasons are informed clearly.

When processes derived from cancellation are not performed, judgment which repealed X is not reversed again. Therefore, operator can perform suitable operation such as re-input, and so on, corresponding to this.

(7) An Addition and Deletion of Information

When information is created, also created is "recorded contents of editing work". Version of target DB at this time is recorded as edit version of it. When information of DB is deleted, "recorded contents of editing work" has "the fact of deletion", "object of deletion", "range of influence" and "version". Since this edit (deletion) has a possibility to be judged invalid, this deletion cannot be actually performed to local original DB at this stage. Deletion can be performed, after it is judged as valid.

(7.1) Supplement about Information Addition

When setting a major key (ID) to a record in RDB, keys must not overlap to other records. In parallel DB access, considerations for it are necessity. That is, when two or more PCs add a record in parallel manner, records should not have same major key.

If major keys assigned to records by PCs collide, they can be changed for avoiding the collision, in a case where the server updates global original DB. When PC synchronizes its duplicated DB with the original DB, the PC will know the new major key.

For cases where global original DB is not placed but each PC updates local original DB, there are some methods of avoiding the collision of major keys, (Method No. 1 of evading collision of major keys) Collision of major keys of new records is avoidable, if a server or management PC assigns a range of major keys that will be use for new records, to each PC. It is possible to avoid collision by using UUID as a major key.

(Method No. 2 of evading collision of major keys) Record (K), that keeps next major key to be used, is set in DB. Newly created record (Z) uses this value of "K" as a major key. After this, value of "K" is updated. If updating of K is judged as valid under the rule that "priority is assigned to an edit based on the newest information", addition of the record is completed. If invalid, updating of value K will be invalid. And addition of record(Z) will be treated as invalid.

(Method No. 3 of evading collision of major keys) If collisions of major keys of new records are detected when local original DB is updated by sets of "recorded contents of editing work", a set of "recorded contents of editing work" with newer version of edit will be adopted. This means that, there is a case that even if it is judged as valid by confirming version of edit, it is decided as invalid by check of contents. Further examination is required in order to guarantee the consistency of information.

<<Correspondence with Claims at the First Submission>>

Updating processes of original DB (global original DB or local original DB) are same at the following two cases. One case is that each PC updates its local original DB. Another case is that the server updates global original DB. This is shown in claim 1. Word "database" is used for concept covering global original DB, its duplicated DB, local original DB, DB for temporal working, and so on. This is a method of "assigning priority to edit based on newer information". This is effective not only for full-scale "parallel DB edit" in which computer keeps duplicated DB permanently, but also for a case that computer temporally holds duplicated DB.

Claim 2 describes version updating process to database. Claim 3 describes concept of version setting range. Here, simple phrase of "specified range of information" is used. However, it is not fixed to a particular method of the specifying. Various ways will be assumed. For example, it is beforehand specified by the system, or is specified by "recorded contents of editing work", or others.

Claim 4 corresponds to a method that uses time of acceptance of "recorded contents of editing work" by the server as version, or to a method that uses time of synchronization access to Server. They does not limit method that sets the "specified time". Claim 5 corresponds to an operation with cancellation of updating, and has process D and E between process B and C. Claim 6 is claim 1 with concept of "range of checking no-change".

Claim 7 corresponds to a case that the server updates global original DB. Claim 7 is claim 1 with procedure F of "sending information of updated said database to another PC from the server". Claim 8 is a case that arriving time of "recorded editorial content" to the server is set as version of database.

Claim 9 is claim 2 with a process of "time of synchronization access to the server is set as a version of DB". Claim 10 is added with a process of "time of downloading recorded contents of editing work is set as a version of updated local original DB". Claim 11 is claim 1 with a process to telling other computers the following. "Stop editing work", or "stop sending up editorial contents", or "prohibition of updating local original DB".

Effect of the Invention

If parallel DB edit was implemented by extension of traditional cache art, a copy is created for each editing work. Extra load of these copy processes and communications was a problem. This problem will be solved by a method that uses a local original DB of each PC permanently. A local original DB is updated by "recorded contents of editing work" created by each PC. There is no need to duplicate whole of huge DB as a local original DB. Sufficient is local original DB that only holds a portion required for a computer is enough.

If method assigning priority to earlier-arrival, which is based on the traditional cache art, is used, there is a possibility that a judgment based on the latest information becomes invalid. However, this problem is solved by method of the present invention, which is based on the policy of assigning priority to edit based on newer information.

There will be operational problems, if the traditional method, by which first-edit priority, is used. However, this problem is solved by the "operation without cancellation of updating" of the present invention. Cancellation by "operation with cancellation of updating" of the present invention will occur only at very limited situations. Possibility of the cancellation can be small, by shortening a cycle that is from "synchronizing and editing local original DB" to "sending up the recorded contents of editing work".

Criteria of "assigning priority to edit based on newer information" of the present invention is a thought that judgment based on newer information is more certain. The criteria will be easily accepted by persons who treat data.

Without dividing DB, management of updating information will be clear as if DB had been divided, by the concept of "version setting range" of the present invention. Furthermore, competitions that should be solved truly, will be detected by the concept of "range of checking no-change".

The operation placing importance on "assigning priority to edit based on newer information" will be possible, by the followings. Version of local original DB is set to the date and time when the server accepted "recorded contents of editing work" that was lastly applied. Or the version is set to the data and time when computer checked existence of recorded contents of editing work.

Further, the present invention has shown mechanisms that prevent "cancellation of updating", by prohibiting "edit", "sending up of edit", "updating of local original DB".

DESCRIPTION OF NOTATIONS

Figure 1:
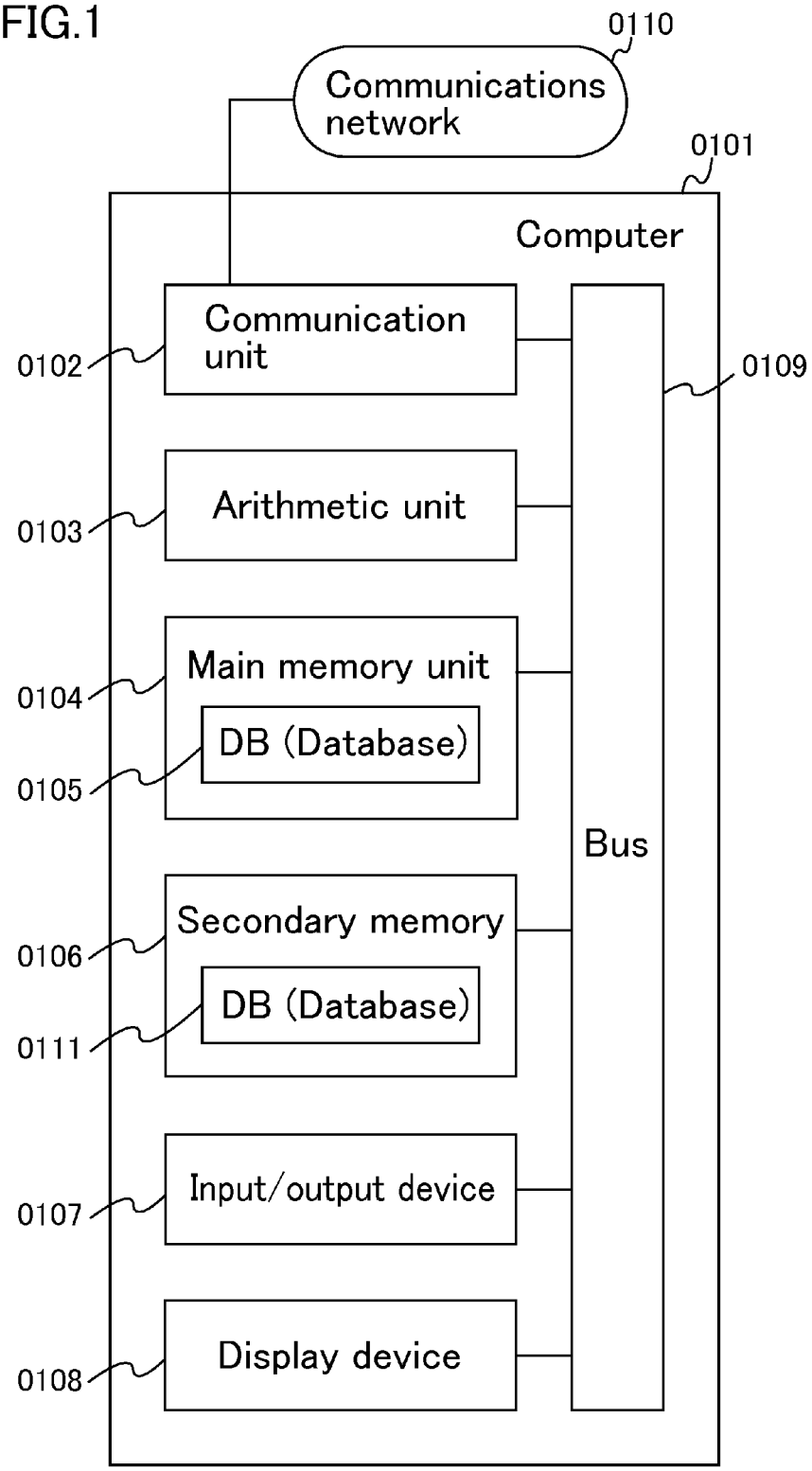
FIG. 1. Structure of general computer
FIG. 2. Case of updating local original DB of PC
FIG. 3. Procedure (No. 1) of updating local original DB
FIG. 4. Procedure (No. 2) of updating local original DB
FIG. 5. Case of updating global original DB of Server
FIG. 6. Procedure (No. 1) of updating global original DB
FIG. 7. Procedure (No. 2) of updating global original DB
FIG. 8. Procedure of telling "stop of sending up", by Server
FIG. 9. Procedure of telling "stop of editing work", by Server
FIG. 10. Simplified example

0100 Computer
0102 Communication unit
0103 Arithmetic unit
0104 Main memory unit
0105 DB (Database) in main memory unit
0106 Secondary memory
0107 Input/output device
0108 Display device
0109 Bus
0110 Communications network
0111 DB (Database) in secondary memory
0201 PC
0202 Communications networks, such as Internet
0203 Server
0204 Memory storage (of PC)
0205 Memory storage (of Server)
0206 Local original DB
0207 Initial "global original DB"
0208 Recorded contents of editing work
0209 DB for temporal working
0210 "Recorded contents of editing work" n
0210 "Recorded contents of editing work" n+1
0211 "Recorded contents of editing work" m
0213 Editing means
0214 Updating means
0215 Sending means
0216 Receiving means
0217 Means for managing on sending and receiving
0218 "Recorded contents of editing work" 1
0219 "Recorded contents of editing work" m
0220 Sending means
0221 Receiving means
0222 Means for managing on sending and receiving
0301 Receiving "recorded contents of editing work" that were not yet received
0302 Putting them to a list of "recorded contents of editing work" not yet processed
0303 Taking out a set of "recorded contents of editing work" (Y) from list of "recorded contents of editing work" not yet processed
0304 Fetching "version of edit" and "range of checking no-change", from "recorded contents of editing work" (Y) that is object of the process
0305 Fetching "recorded contents of editing work" (X) that changed information in the "range of checking no-change"
0401 Comparing the version of edit (x) of past "recorded contents of editing work" (X) and the version of edit (y) of "recorded contents of editing work" (Y) to be processed
0402 Comparing x and y
0403 Taking out (again in order) the past "recorded contents of editing work" (X) that changed information in "range of checking no-change".
0404 Detecting version (nx) of local original DB updated by the past "recorded contents of editing work" (X) taken out
0405 Comparing "nx" and "y"
0406 Cancelling the updating to the local original DB by the past "recorded contents of editing work" (X) taken out
0407 Updating the local original DB by "recorded contents of editing work" (Y) to be processed
0408 Updating version of the local original DB
0501 PC
0502 Communications network such as Internet
0503 Server
0504 Memory storage (of PC)
0505 Memory storage (of Server)
0506 Local original DB
0507 Global original DB
0508 Recorded contents of editing work
0509 DB for temporal working
0510 Information of updating local original DB
0511 Editing means
0512 Updating means
0513 Sending means
0515 Receiving means
0515 Means for managing on sending and receiving
0516 Information of updating local original DB
0517 Updating means
0518 Sending means
0519 Receiving means
0520 Means for managing on sending and receiving
0601 Receiving "recorded contents of editing work"
0602 Fetching version of edit (y) and "range of checking no-change" from "recorded contents of editing work" (Y) that is object of the process.
0603 Taking out the past "recorded contents of editing work" (X) that changed information in "range of checking no-change"
0604 Comparing the version of edit (x) of the past "recorded contents of editing work" (X) taken out and the version of edit (y) of "recorded contents of editing work" (Y) to be processed 0605 Comparing x and y
0701 Taking out (again in order) the past "recorded contents of editing work" that changed information of "range of checking no-change"
0702 Detecting version (nx) of global original DB updated by past "recorded contents of editing work" (X) taken out.
0703 Comparing "nx" and "y"
0704 Cancelling the updating to the global original DB by past "recorded contents of editing work" (X) taken out
0705 Updating local original DB by "recorded contents of editing work" (Y) to be processed
0706 Updating version of global original DB
0801 Receiving an request (with the last number received at the previous time) to send "recorded contents of editing work"
0802 Confirming a stop of sending up
0803 Telling a stop of sending up
0804 Making a list of sets of "recorded contents of editing work" not yet sent.
They are after the last number already received
0805 Sending
0806 Telling completion
0901 Receiving an request (with the last number received at the previous time) to send "recorded contents of editing work"
0902 Making a list of sets of "recorded contents of editing work" that are not yet sent
0903 Sending
0904 Judgment to stop editing work
0905 Telling a stop of editing work
0906 Telling completion
1002 PC-A
1003 PC-B
1004 Initial DB
1005 Updating local original DB (of PC-A)
1006 Updating local original DB (of PC-B)
1008 Duplication of record Z (of PC-A)
1009 Duplication of record Z (of PC-B)
1010 Acquisition of initial "global original DB" (by PC-A)
1011 Acquisition of initial "global original DB" (by PC-B)
1012 Synchronization (by PC-A)
1013 Editing work (by operator of PC-A)
1014 Sending edit (by PC-A). That is, sending edit up.
1016 Confirmation (telling to PC-A) and synchronization (by PC-A).
This synchronization is acquisition of new editorial contents and its turn, and it is the same also in explanation of other signs.
1017 Synchronization (by PC-B)
1018 Editing work (by operator of PC-B)
1019 Sending edit (by PC-B). That is, sending edit up.
1021 Confirmation (telling to PC-B) and synchronization (by PC-B).
1022 Synchronization (by PC-B)
1023 Amendment (of record z of PC-A by edit by PC-B)

BEST MODE OF CARRYING OUT THE INVENTION

The method of the present invention can be implemented as a program of computer. FIG. 1 shows typical structure of computer 0101. Arithmetic unit 0103, main memory unit 0104, secondary memory 0106, input/output device 0107, display device 0108 are connected by bus 0109. When exchanging data with other computers, it connects with communications network 0101 via communication unit 0102. The "database" of each claim is DB 0111 in secondary memory 0106, or DB 0105 in main memory unit 0104.

Programs are recorded in secondary memory 0106, are loaded to main memory unit 0104 and are invoked. Arithmetic unit 0103 runs under instructions of them. Thus, computer is reconstructed as aggregate of a means to realize operations that program developer intended.

Figure 2:
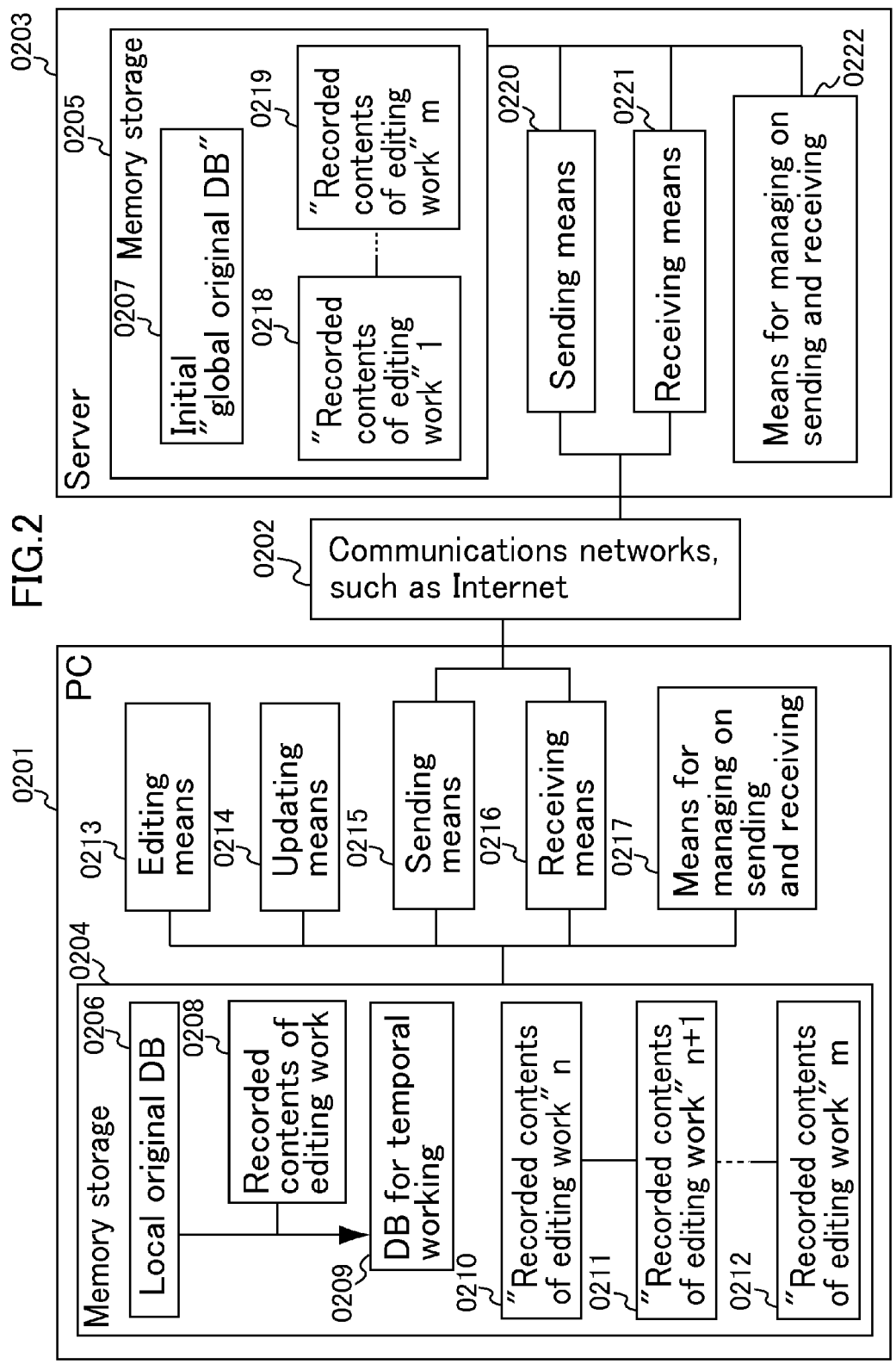
Figure 5:
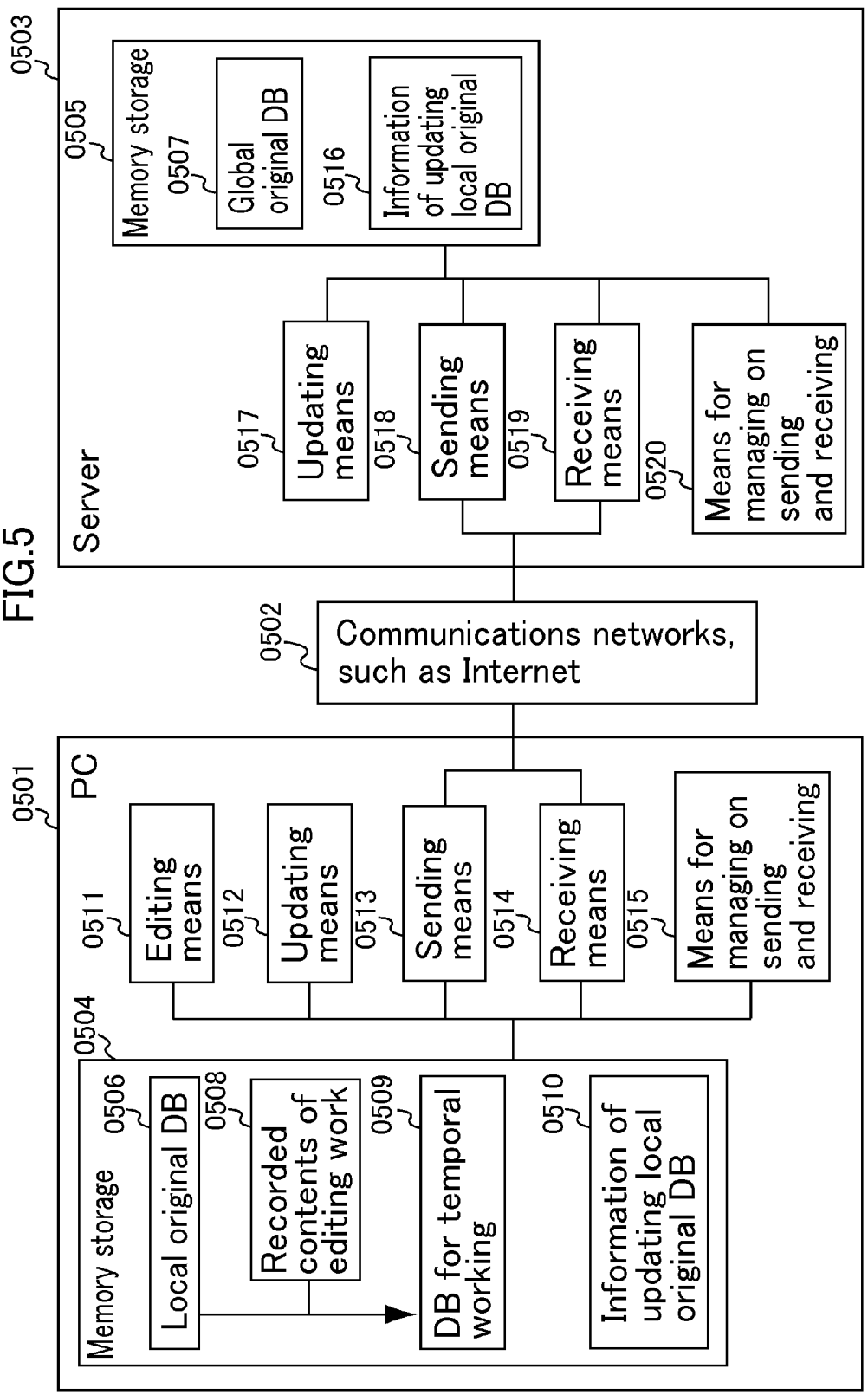

Operation of DB by programs usually will be performed, after loading the whole (or a part) of DB to main memory unit 0104. All (or a part) of DB 0111 in secondary memory 0106 is loaded as DB 0105 on main "memory operation 0104". This DB 0105 will be manipulated. The editorial result will be written into DB 0111 in secondary memory 0106. However, usually DB is assumed to be in secondary memory 0106, and there is no difference to DB 0105 that is loaded to "main memory operation 0104", at usual discussions. FIGS. 2 and 5 simply shows DBs in memory storages 0204, 0205, 0504, 0505.

FIG. 2 shows the following case. Server 0203 collects "recorded contents of editing work" made by plural PCs 0201. PC 0201 receives these "recorded contents of editing work" collected to the server, and updates its local original DB. PC 0201 has been connected with the server via communications network 0202, such as Internet. Although plural PCs generally exist, FIG. 2 shows only one.

PC 0201 has memory storage 0204 in which local original DB 0206 was recorded. Initial value of local original DB 0206 is a copy of initial "global original DB" 0207 in memory storage 0205 of Server 0203. Editing means 0213 performs edit by instructions of operator of PC 0201. At this time, local original DB 0206 is not directly edited. Results of this edit will be a DB for temporal working 0209. Simultaneously, "recorded contents of editing work" 0208 is created. This "recorded contents of editing work" has a "version of edit", that is, a version that was set to the local original DB.

"Recorded contents of editing work" 0208 is sent to the server 0203 by sending means 0215 via communications network 0202. By receiving means 0221, the server 0203 receives it, which will be added to a line from recorded contents of editing work 1 0218 to recorded contents of editing work m 0219.

"Recorded contents of editing work" has version of edit, and so on. If "version of edit" and "recorded contents of editing work" have been sent separately to the server, correspondence among them is recorded.

When trying update of local original DB 0206, PC 0211 request the server to send "recorded contents of editing work" not yet received. PC tells the last version of "recorded contents of editing work" already received. "Means for managing on sending and receiving" selects "recorded contents of editing work" that are after the version. They are sent from the server by "sending means 0220". "Means for managing on sending and receiving" 0217 performs cooperation of sending and receiving of PC. "Means for managing of sending and receiving" 0222 performs cooperation of sending and receiving of the server.

"Recorded contents of editing work" 0210, 2011, 0212, which were received by "receiving means" 0216 of PC 0201, are recorded in memory storage 0204. "Updating means" 0214 takes them out in order, judges validity of them, and updates local original DB 0206 and its version.

Figure 3:
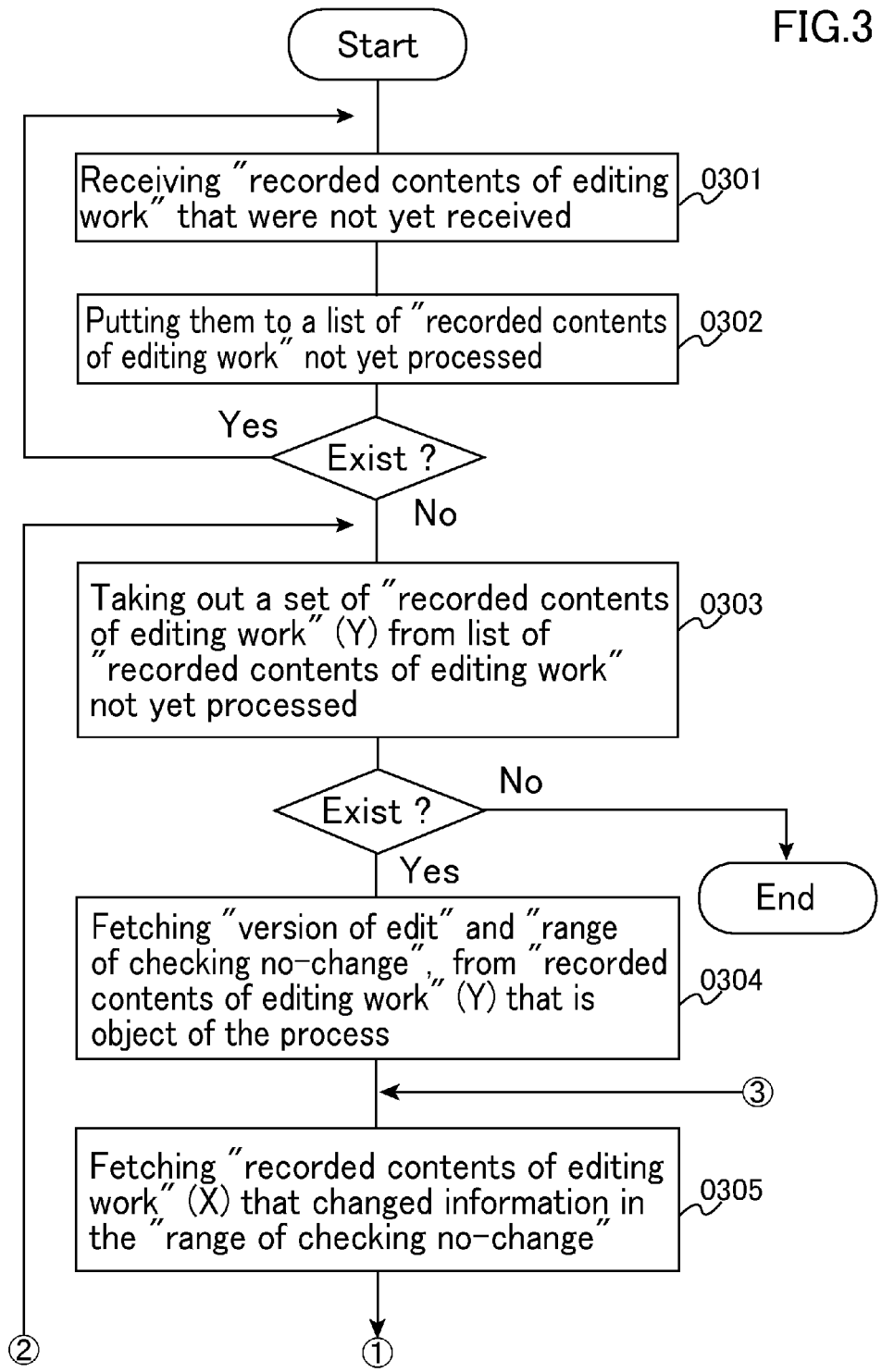
Figure 4:
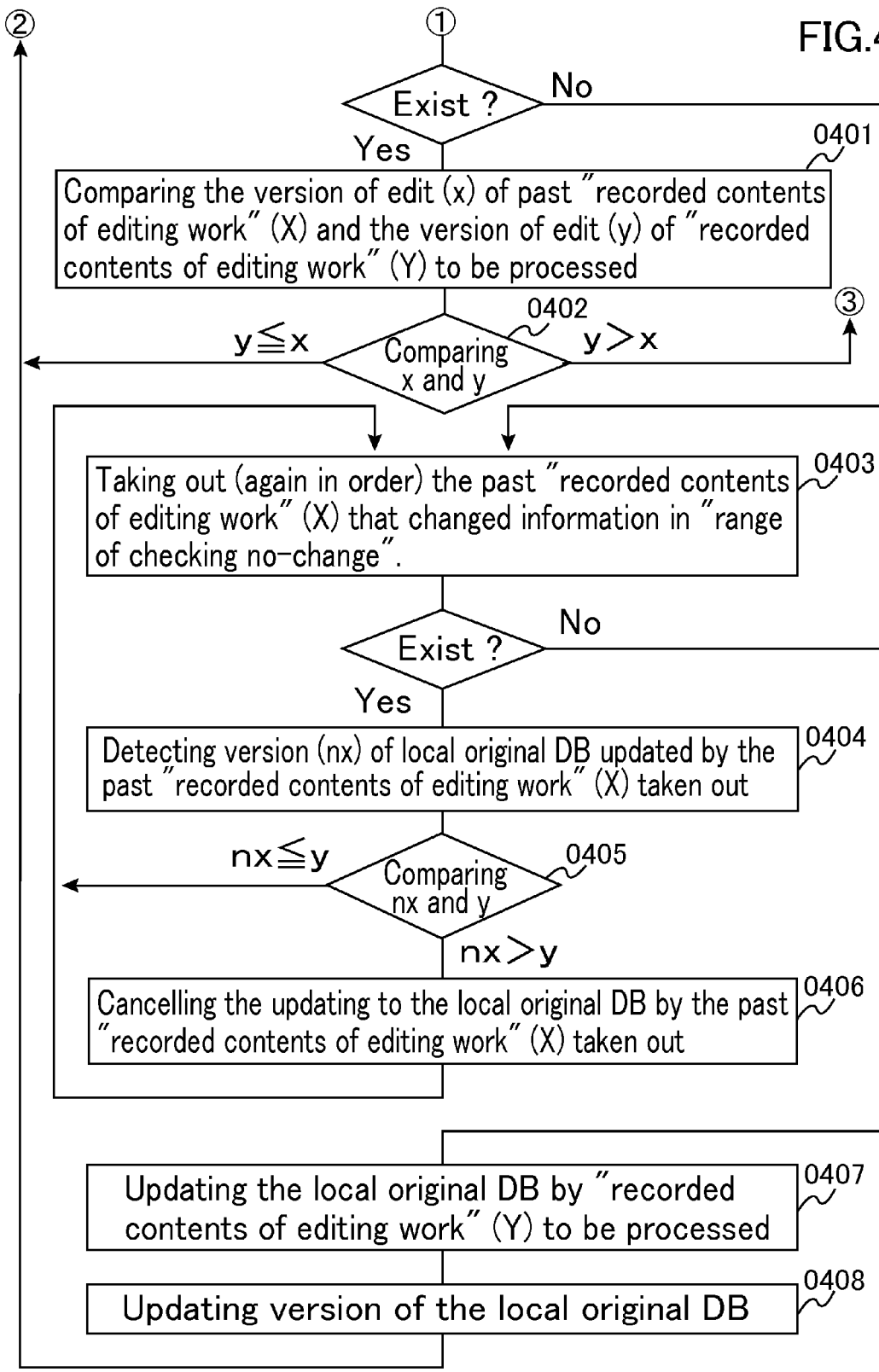

FIGS. 3 and 4 show updating procedure by updating means 0214 of PC 0201. PC (0201) first receives "recorded contents of editing work" that were not yet received" (0301) and puts them into "list of recorded contents of editing work that were not yet processed" (0302). And PC repeats this process for all "recorded contents of editing work" that was not yet received. List of sets of "recorded contents of editing work" that are not yet processed, is from "recorded contents of editing work" n 0210, "recorded contents of editing work" n+1, 0211, to "recorded contents of editing work" m 0212 of FIG. 2.

Next, PC takes out a set of "recorded contents of editing work" (Y) from a list of sets of "recorded contents of editing work" that is not yet processed 0303. PC fetches version of this edit (y) and "range of checking no-change", from "recorded contents of editing work" (Y) that is object of the process 0304. And, PC fetches a set of "recorded contents of editing work" (X) that changed information of the "range of checking no-change" 0305. PC compares 0401 the "version of edit" (x) of the past "recorded contents of editing work" (X) and the "version of edit" (y) of "recorded contents of editing work" (Y) (that will be processed). PC compares x and y 0402. When "y<x" or "y=x", recorded contents of editing work (Y) (that is a object of the processing) is judged invalid. And updating process will not be invoked. PC moves to the next set of "recorded contents of editing work" that is not yet processed (go to 0303).

When "y>x", Y is valid for X. PC moves (for investigation) to the next set of the past "recorded contents of editing work" (go to 0305). After completing fetching "recorded contents of editing work" (X) that changed information in the "range of checking no-change", PC moves to next process (0403), if unprocessed set of "recorded contents of editing work (Y)" is valid for all.

Next, PC takes out (again in order) the past set of "recorded contents of editing work" (X), that changed information of "range of checking no-change" 0403. If exists, PC detects version (nx) of updated local original DB by past "recorded contents of editing work" (X) that is taken out 0404. PC compares x and y 0405. When "y<nx", PC cancels the updating to the local original DB by the past "recorded contents of editing work" (X) that is taken out 0406.

PC completes taking out the past recorded contents of editing work again, by "taking out (again in order) the past recorded contents of editing work that changed information in "range of checking no-change" 0403. Next, PC updates (0407) the local original DB by "recorded contents of editing work (Y)" to be processed and updates (0408) version of the local original DB.

The following procedure will be used, if "version setting range" is already assigned and if this is equivalent to "range of checking no-change". Here, we assumed that "version setting range" is already specified in "recorded contents of editing work". We discuss about the process of comparing (0401) the version of edit (x) of past "recorded contents of editing work (x)" and the version of edit (y) of "recorded contents of editing work (Y)" to be processed. For "version setting range" specified to set of "recorded contents of editing work" (Y), PC specifies "version of edit" (x) of the past set of "recorded contents of editing work" (X) and "version of edit" (y) of the set of "recorded contents of editing work" (Y) that is object of the processing. Later comparison of versions is performed to them.

At operation that uses "time when the server received recorded contents of editing work" as version, the server records the reception time into "recorded contents of editing work". At "updating version of the local original DB (0408)", PC records "reception time recorded in set of recorded contents of editing work that will be used for updating" as version of updated local original DB 0408.

Suppose the following operation. PC accesses to the server, receives (from the server) time of confirming existence of "recorded contents of editing work" not yet received, and sets the time as version of the original DB. Under this operation, PC gets "time of accessing to the server", in the middle (or around) of the following processes. That are "receiving recorded contents of editing work that was not yet received (0301)" and "putting it to a list of recorded contents of editing work not yet processed (0302)". Considering time gap among PCs, it is desirable to get the time from the server. First, the time is temporally recorded. After local original DB is updated by the last of "recorded contents of editing work" received 0407, the temporally recorded time is set as version of local original DB 0408.

FIG. 5 explains a case that the server updates global original DB. PC 0501 is connected to the server 0503 via communication network 0502. Though there are plural PCs generally, FIG. 5 shows only one.

PC 0501 has memory storage 0504 in which local original DB 0506 is recorded. Editing means 0511 performs editing work by instruction of an operator of PC 0501. At this time, local original DB 0506 is not directly edited. Result of editing work will be DB 0509 for temporal working. Simultaneously, "recorded contents of editing work" 0508 will be created. This "recorded contents of editing work" has "version of edit", that was version set to local original DB.

"Sending means" (0513) sends a set of "recorded contents of editing work" 0508 to the server 0503 via communications network 0502. The server 0503 receives it by "receiving means" (0519), judges validity of it by versions recorded in the set of "recorded editorial content", and updates global original DB 0507. At this time, information of updating local original DB 0516 is created. Information of updating local original DB 0516 is sent to PC 0501 by "sending means" (0518) of the server. This information is received by "receiving means" (0514) and is recorded in memory storage (0504). "Updating means" (0512) update local original DB (0506) by the information of updating local original DB 0510. Cooperation of sending and receiving of PC is performed by "means on managing of sending and receiving" 0515. Cooperation of sending and receiving of the server is performed by "means for managing on sending and receiving" 0520.

Figure 6:
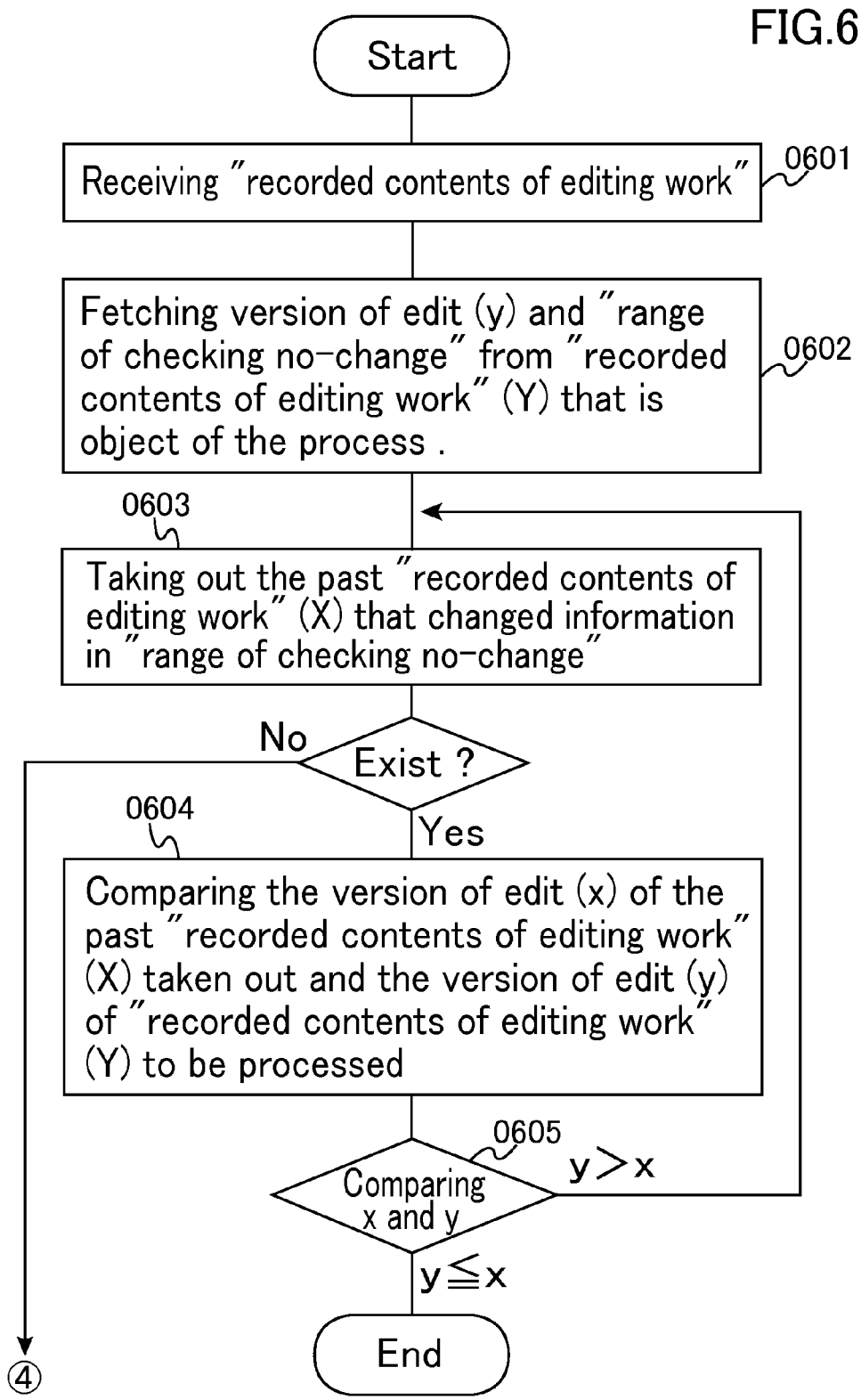
Figure 7:
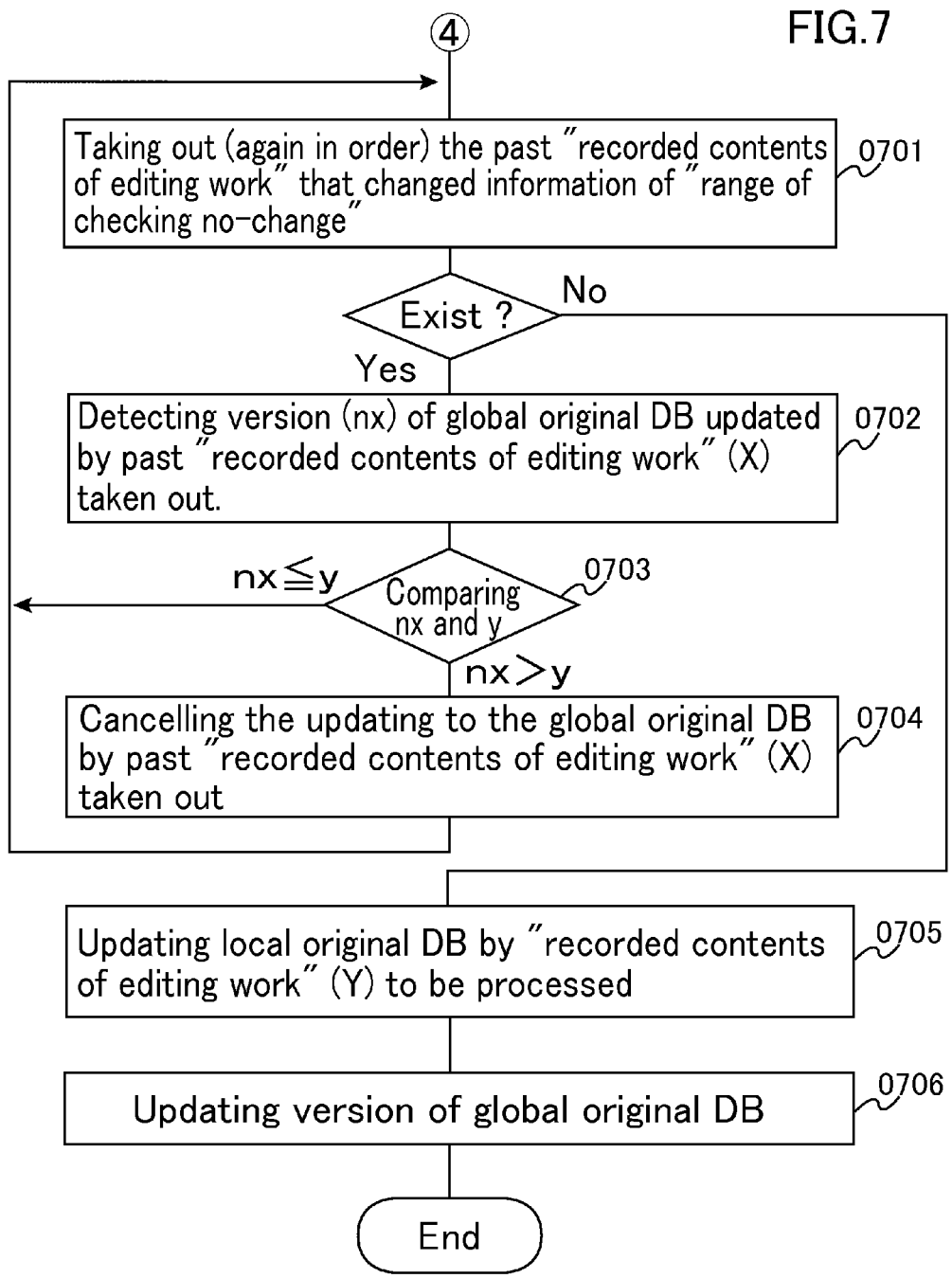

FIGS. 6 and 7 show updating procedure of global original DB by the server 0503. The server receives recorded contents of editing work 0601 from PC 0501, and takes out version of edit (y) and "range of checking no-change" 0602 from this recorded contents of editing work (Y) that is object of processing. The server takes out the past set of "recorded contents of editing work" (X), which has changed information in "range of checking no-change" 0603. It compares a "version of edit" (x) of the past set of "recorded contents of editing work" (X) that was taken out and the version of edit (y) of "recorded contents of editing work" (Y) to be processed 0604. The server compares x and y. When "y<x" or "y=x", the set of "recorded contents of editing work" (Y), which is object of processing, is judged invalid. And the updating will not be invoked.

When "y>x", Y is valid for this X. Then, it moves to the investigating of the next sets of the past "recorded contents of editing work" (go to 0603). The server completes the process (0603) of taking out the past "recorded contents of editing work" (X) (that changed an information in "range of checking no-change"). If unprocessed set of "recorded contents of editing work" (Y) is valid for all, it is judged as valid. It moves to the next process (go to 701).

Next, it takes out (again in order) the past "recorded contents of editing work", which changed information of "range of checking no-change" 0701. If object to be taken out exists, it specifies (0702) the version (nx) of global original DB updated by recorded contents of editing work (X) that was taken out. It compares (0703) x and y. If y<nx, it cancels the updating to the global original DB by the past "recorded contents of editing work" (X) taken out 0704.

It completes the process (0701) of taking out again the past "recorded contents of editing work" (that changed information in "range of checking no-change"). Next, it updates (0705) local original DB by "recorded contents of editing work" (Y) (that is object of the process), and updates version of global original DB 0706.

Figure 8:
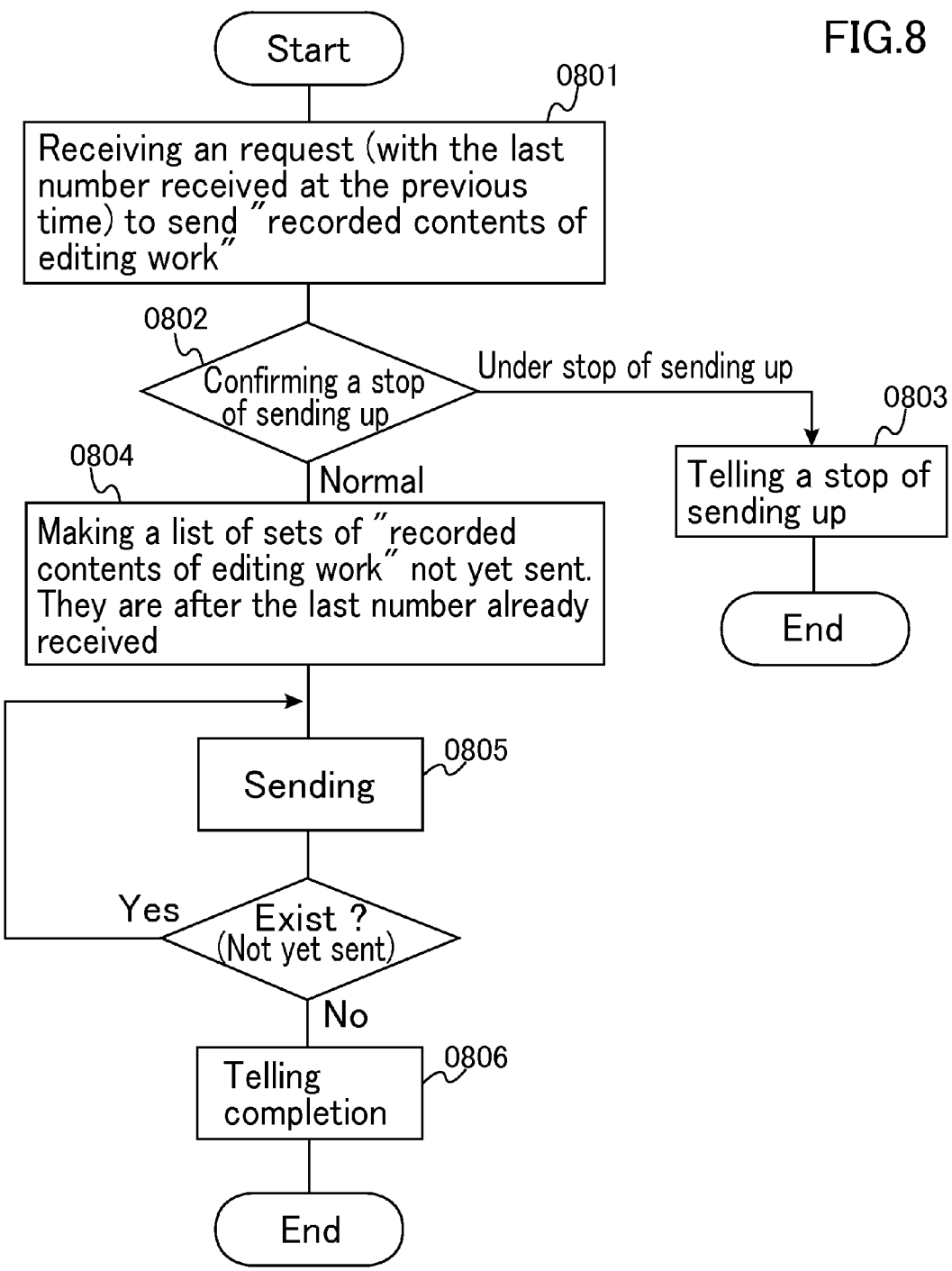

FIG. 8 explains procedure, by which the server tells PC to stop sending up, for preventing cancellation of updating. When the server receives (0801) a request (with the last number received at the previous time) of sending "recorded contents of editing work", the server checks that sending up is prohibited or not. When the server is in the situation of "stop of sending up" based on request of a PC, the server tells (0803) "stop of sending up" to a PC, which requested sending "recorded contents of editing work". When the server is not in the situation of "stop of sending up", the server makes (0804) a list of sets of "recorded contents of editing work" that are not yet sent. These sets are after the last number received at the previous time. The server sends them to PC 0805, and finally tells completion 0806.

Figure 9:
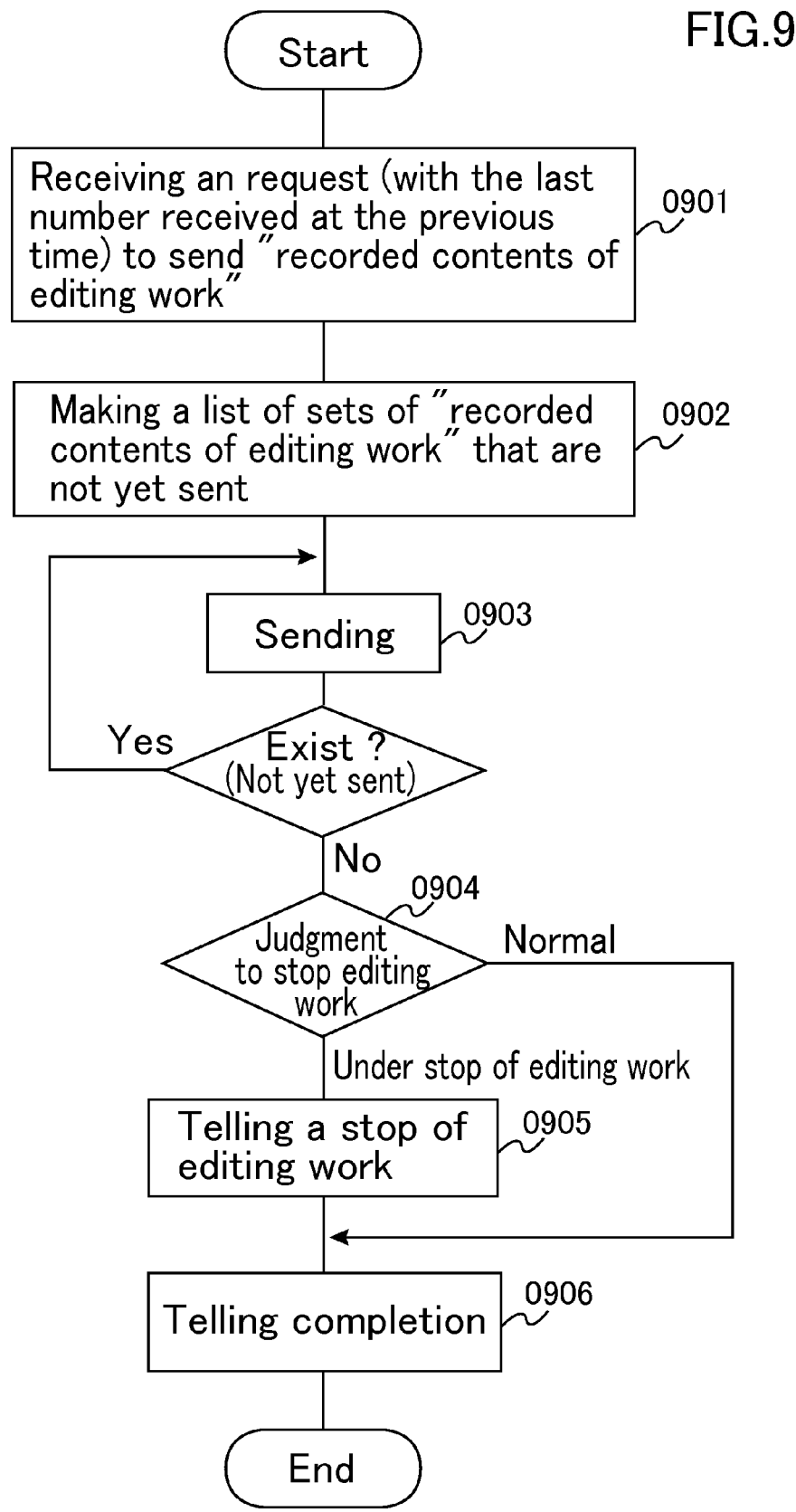

FIG. 9 explains procedure that the server tells PC to stop editing work for preventing cancellation of updating. When the server receives (0901) an request of sending "recorded contents of editing work" (with the last number received at the previous time) from PC, the server makes (0902) a list of sets of "recorded contents of editing work" that are not yet sent. The server sends it to PC 0903. Next, the server checks about "stop edit (to local original DB)" 0904. If the server is in situation of "stop edit" based on a request from a PC, the server tells "stop of edit" to a PC, which requested sending "recorded contents of editing work". The server finally tells completion 0906.

<Simplified Example>

Figure 10:
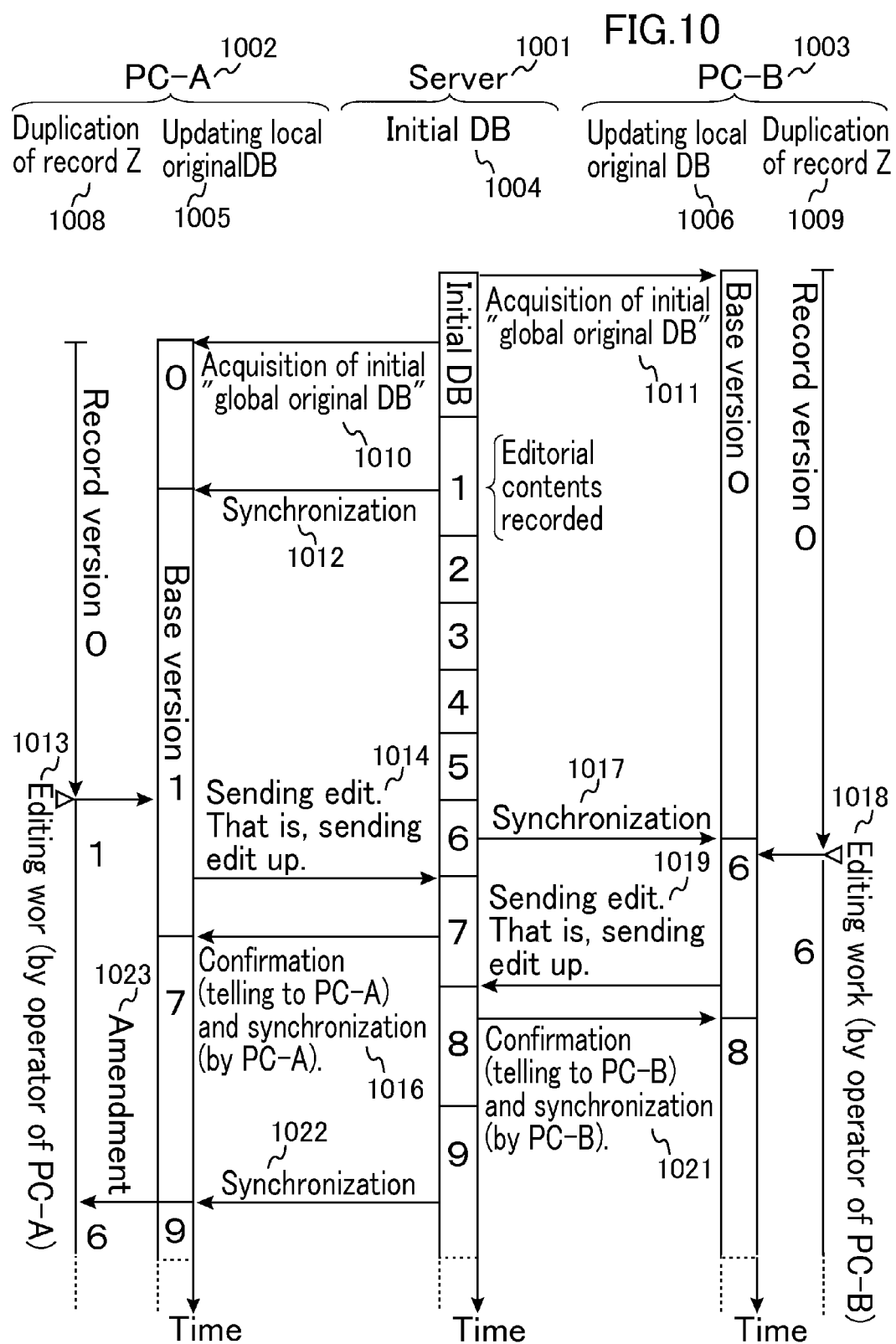

FIG. 10 shows another example. DB of FIG. 10 is RDB. "Version setting range" is whole of DB. Version is expressed by integer. "Range of checking no-change" is only a record edited. Used is the operation without cancellation of updating.

Each record has "record version", which is a edit version of the time when the record was edited. Then, merely by comparing record version (of the object of edit) and version of edit (y) of "recorded contents of editing work" (Y), the following two processes are automatically performed. That are "fetching recorded contents of editing work (X) that changed information in the range of checking no-change (0305)" and "comparing the version of edit (x) of past recorded contents of editing work (x) and the version of edit (y) of recorded contents of editing work (Y) to be processed (0401)".

This example is simplified. However, it is convenient for seeing a change of version.

The server of FIG. 10 has initial "global original DB", "recorded contents of editing work" and their "turns of arrival (turn of sending up)". The vertical axis of the server shows the newest edit at the time.

"PC-A 1002 and PC-B 1003 get initial "global original DB" as each local original DB 1005, 1006." 1010, 1011. Since they copy initial "global original DB"1004, base version of them are 0. Next, edit 1 to 6 are sent up to the server 1001. They are sent up by PCs other than PC-A 1002 and PC-B 1003.

In FIG. 2, PC-A 1002 accesses the server again, gets newest edit, and gets its turn 1012.

Since it receives edit "1" at this time, version of local original DB 1005 will be "1".

Now, suppose that operator of PC-A 1002 edits (1013) duplication (1008) of record Z of local original DB 1005. At this time, record version of edited "duplication of record Z 1008" is set to "1", because base version of local original DB 1005 is "1". This "recorded contents of editing work" is sent up to the server 1014, and recorded as edit 7. Immediately after it, PC-A 1002 receives edit from "2" to "6", that were sent up after edit "1". PC-A confirms that the previous one (sent up by PC-A) was named edit "7". Using "logic to judge the validity of edit" specified beforehand, edits (up to "7") are investigated in order. And local original DB 1005 is updated. Here, assuming that edit "7" is judged as valid, base version of local original DB 1005 will be "7".

On the other hand, PC-B 1003 receives (1017) edits from "1" to "6" (that is the latest at this time of synchronization 1017), updates local original DB 1006, and sets "6" to the base version. Next, suppose that operator of PC-B 1003 edited (1018) "duplication of record Z 1009".

At this time, record version of "duplication of record Z 1009" is changed to "6". A set of "recorded contents of editing work" is sent up to the server 1019. The server records it as edit "8".

And, after edit "9" is sent up by another PC, PC-A 1002 accesses the server 1001, and receives (1022) edit "8" and "9" that were sent up after edit "7". Applying edit "8" and "9" to local original DB 1008 in order, it judges validity of them and updates local original DB 1008 in order. Here, version of duplicated DB 1008 becomes "9", since edit "9" is applied to local original DB 1008. At this time, PC-A 1002 knows the followings. Contents of "duplication of record Z", which was edited by PC-B 1003 previously, becomes valid at the local original DB 1005 of PC-A 1002. Contents of "duplication of record Z", which was edited by PC-A 1002 previously, becomes invalid.

Industrial Applicability

It is convenient if database can be edited in parallel by plural computers. But problem is the conflict resolution of parallel editing work. Conflict resolution method of the present invention is a mechanism of assigning priority to edit based on newer information. It is effective for full-scale "parallel DB edit" by which computers keep duplicated DB permanently. And also effective for a case that a computer holds duplicated DB temporally. This method has a feature that edit based on old information will be judged invalid. When editing information to which competitions are expected, we can use "almost on-line operation", which quickly performs "synchronization with the latest information", "editing work" and "sending the recorded contents of editing work". Possibility that the editing work becomes invalid can be small by this operation. On the other hand, when editing information to which competitions are not expected, we can use "almost on-line operation", which slowly performs editing work after synchronization of information and sends recorded contents of editing work collectively. The method of the present invention enabled parallel editing work to database of broad fields.

I claim:

1. A method of updating a database, comprising a sequence of procedures:
   a first procedure including
      a step of receiving a first editing work to said database, and
      a step of fetching a first ordinal number that was a version number of said database at the time of making said first editing work and has been assigned to said first editing work,
   a second procedure including
      a step of comparing said first ordinal number and a second ordinal number that was a version number of said database at the time of making said second editing work,
   a third procedure including
      a step of updating said database by said first editing work, if said first ordinal number is newer than said second ordinal number.

2. A method of updating a database, according to claim 1, wherein, said third procedure further includes
   a step of updating an ordinal number of said database, if said first ordinal number is newer than said second ordinal number.

3. A method of updating a database, according to claim 1, wherein, said third procedure further includes
   a step of cancelling said second editing work, if said first ordinal number is newer than said second ordinal number.

4. A method of updating a database, according to claim 1, wherein, said third procedure further includes
   a step of cancelling said second editing work, if said first ordinal number is newer than said second ordinal number, and
   if the second editing work edited inside of the no-change range defined for the first editing work.

5. A method of updating a database, according to claim 1, wherein, said first procedure further includes
   a step of performing an investigation of existence of un-received editing work to said database, said third procedure further includes
   a step of setting the investigation time of the first procedure as an ordinal number of said database.

6. A method of updating a database, according to claim 1, wherein, said third procedure further includes
   a step of setting the time of receiving said first editing work by the first procedure as an ordinal number of said database.

7. An apparatus of updating a database, comprising the following blocks:
   a first block, at least
      receives a first editing work to said database, and
      fetches a first ordinal number that was a version number of said database at the time of making said first editing work and has been assigned to said first editing work,
   a second block, at least
      compares said first ordinal number and a second ordinal number that was a version number of said database at the time of making said second editing work,
   a third block, at least
      updates said database by said first editing work, if said first ordinal number is newer than said second ordinal number.

8. An apparatus of updating a database, according to claim 7, wherein, said third block further
   updates an ordinal number of said database, if said first ordinal number is newer than said second ordinal number.

9. An apparatus of updating a database, according to claim 7, wherein, said third block further
   cancels said second editing work, if said first ordinal number is newer than said second ordinal number.

10. An apparatus of updating a database, according to claim 7, wherein, said third block further
    cancels said second editing work,
    if said first ordinal number is newer than said second ordinal number, and
    if the second editing work edited inside of the no-change range defined for the first editing work.

11. An apparatus of updating a database, according to claim 7, wherein, said first block further
    performs an investigation of existence of un-received editing work to said database, said third block further
    sets the investigation time of the first procedure as an ordinal number of said database.

12. An apparatus of updating a database, according to claim 7, wherein, said third block further
    sets the time of receiving said first editing work by the first procedure as an ordinal number of said database.

* * * * *